United States Patent
Tzur et al.

(10) Patent No.: US 12,225,158 B2
(45) Date of Patent: Feb. 11, 2025

(54) SYSTEM(S) AND METHOD(S) FOR IMPLEMENTING A PERSONALIZED CHATBOT

(71) Applicant: GOOGLE LLC, Mountain View, CA (US)

(72) Inventors: Yoav Tzur, Tel Aviv (IL); Yaniv Leviathan, New York, NY (US); Yossi Matias, Tel Aviv (IL); Jan Jedrzejowicz, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 227 days.

(21) Appl. No.: 18/082,424

(22) Filed: Dec. 15, 2022

(65) Prior Publication Data

US 2024/0205332 A1    Jun. 20, 2024

(51) Int. Cl.
*H04M 1/64* (2006.01)
*G06F 40/35* (2020.01)
(Continued)

(52) U.S. Cl.
CPC .......... *H04M 3/4936* (2013.01); *G06F 40/35* (2020.01); *G10L 13/02* (2013.01);
(Continued)

(58) Field of Classification Search
CPC ...... H04M 3/4936; G06F 40/35; G10L 13/02; G10L 15/1815
See application file for complete search history.

(56) References Cited

U.S. PATENT DOCUMENTS 5,815,566 A    9/1998    Ramot et al.
6,304,653 B1   10/2001   O'Neil et al.
(Continued)

FOREIGN PATENT DOCUMENTS

CN    103795877    5/2014
CN    105592237    5/2016
(Continued)

OTHER PUBLICATIONS

European Patent Office; Invitation to Pay Additional Fees issued in Application No. PCT/US2022/053099; 9 pages; dated Aug. 22, 2023.
European Patent Office; International Search Report and Written Opinion issued in Application No. PCT/US2022/053099; 16 pages; dated Oct. 13, 2023.
(Continued)

*Primary Examiner* — Simon King
(74) *Attorney, Agent, or Firm* — Gray Ice Higdon

(57) ABSTRACT

Processor(s) of a client device of a user can receive a telephone call that is initiated by an additional user, and, in response to receiving the telephone call, identify an entity that is associated with the additional user, and determine, based on the entity that is associated with the additional user, whether to (1) fully automate the telephone call, or (2) partially automate the telephone call. In fully automating the telephone call, the processor(s) can cause a chatbot to engage in a corresponding conversation with the additional user and without prompting the user for any input. In partially automating the telephone call, the processor(s) can cause the chatbot to engage in a corresponding conversation with the additional user but with prompting the user for input(s) via suggestion chip(s). In some implementations, the processor(s) can further determine whether to (3) refrain from automating the telephone call entirely.

20 Claims, 9 Drawing Sheets

(51) Int. Cl.
  *G10L 13/02* (2013.01)
  *G10L 15/18* (2013.01)
  *G10L 15/22* (2006.01)
  *H04M 3/493* (2006.01)
  *H04M 3/527* (2006.01)

(52) U.S. Cl.
  CPC .......... *G10L 15/1815* (2013.01); *G10L 15/22* (2013.01); *H04M 3/527* (2013.01); *G10L 2015/223* (2013.01)

(56) References Cited

U.S. PATENT DOCUMENTS

| | | |
|---|---|---|
| 6,377,567 B1 | 4/2002 | Leonard |
| 6,731,725 B1 | 5/2004 | Merwin et al. |
| 6,922,465 B1 | 7/2005 | Howe |
| 7,084,758 B1 | 8/2006 | Cole |
| 7,337,158 B2 | 2/2008 | Fratkina et al. |
| 7,539,656 B2 | 5/2009 | Fratkina et al. |
| 7,792,773 B2 | 9/2010 | McCord et al. |
| 7,920,678 B2 | 4/2011 | Cooper et al. |
| 8,345,835 B1 | 1/2013 | Or-Bach et al. |
| 8,494,121 B1 | 7/2013 | Barnett |
| 8,594,308 B2 | 11/2013 | Soundar |
| 8,938,058 B2 | 1/2015 | Soundar |
| 8,964,963 B2 | 2/2015 | Soundar |
| 9,232,369 B1 | 1/2016 | Fujisaki |
| 9,318,108 B2 | 4/2016 | Gruber et al. |
| 9,430,570 B2 | 8/2016 | Button |
| 9,467,566 B2 | 10/2016 | Soundar |
| 9,473,637 B1 | 10/2016 | Venkatapathy et al. |
| 10,134,395 B2 | 11/2018 | Typrin |
| 10,318,096 B2 | 6/2019 | Bhardwaj |
| 10,425,533 B1 | 9/2019 | Mossoba et al. |
| 10,542,143 B2* | 1/2020 | Segalis ................ G06F 40/205 |
| 10,671,749 B2* | 6/2020 | Felice-Steele ........ H04L 63/102 |
| 11,005,988 B1 | 5/2021 | Patakokila |
| 11,012,560 B2 | 5/2021 | Segalis et al. |
| 11,056,110 B2 | 7/2021 | Kim |
| 11,134,034 B2 | 9/2021 | Goslin |
| 11,409,425 B2* | 8/2022 | Yaseen ................ G06F 3/0482 |
| 11,689,486 B1* | 6/2023 | Bates ................. H04L 51/21 709/206 |
| 2002/0051522 A1 | 5/2002 | Merrow et al. |
| 2002/0055975 A1 | 5/2002 | Petrovykh |
| 2003/0009530 A1 | 1/2003 | Philonenko et al. |
| 2003/0063732 A1 | 4/2003 | Mcknight |
| 2004/0001575 A1 | 1/2004 | Tang |
| 2004/0083195 A1 | 4/2004 | McCord et al. |
| 2004/0213384 A1 | 10/2004 | Alles et al. |
| 2004/0240642 A1 | 12/2004 | Crandell et al. |
| 2005/0147227 A1 | 7/2005 | Chervirala et al. |
| 2005/0175168 A1 | 8/2005 | Summe et al. |
| 2005/0271250 A1 | 12/2005 | Vallone et al. |
| 2006/0039365 A1 | 2/2006 | Ravikumar et al. |
| 2006/0056600 A1 | 3/2006 | Merrow et al. |
| 2006/0215824 A1 | 9/2006 | Mitby et al. |
| 2007/0036320 A1 | 2/2007 | Mandalia et al. |
| 2007/0201664 A1 | 8/2007 | Salafia |
| 2008/0181371 A1 | 7/2008 | Merrow et al. |
| 2008/0209449 A1 | 8/2008 | Maehira |
| 2008/0309449 A1 | 12/2008 | Martin et al. |
| 2009/0022293 A1 | 1/2009 | Routt |
| 2009/0029674 A1 | 1/2009 | Brezina et al. |
| 2009/0089096 A1 | 4/2009 | Schoenberg |
| 2009/0089100 A1 | 4/2009 | Nenov et al. |
| 2009/0137278 A1 | 5/2009 | Haru et al. |
| 2009/0232295 A1 | 9/2009 | Ryskamp |
| 2010/0088613 A1 | 4/2010 | DeLuca et al. |
| 2010/0094668 A1 | 4/2010 | Gupta |
| 2010/0104087 A1 | 4/2010 | Byrd et al. |
| 2010/0124325 A1 | 5/2010 | Weng et al. |
| 2010/0228590 A1 | 9/2010 | Muller et al. |
| 2011/0092187 A1 | 4/2011 | Miller |
| 2011/0270687 A1 | 11/2011 | Bazaz |
| 2012/0016678 A1 | 1/2012 | Gruber et al. |
| 2012/0109759 A1 | 5/2012 | Oren et al. |
| 2012/0147762 A1 | 6/2012 | Hancock et al. |
| 2012/0157067 A1 | 6/2012 | Turner et al. |
| 2012/0173243 A1 | 7/2012 | Anand et al. |
| 2012/0271676 A1 | 10/2012 | Aravamudan et al. |
| 2013/0060587 A1 | 3/2013 | Bayrak et al. |
| 2013/0077772 A1 | 3/2013 | Lichorowic et al. |
| 2013/0090098 A1 | 4/2013 | Gidwani |
| 2013/0136248 A1 | 5/2013 | Kaiser-Nyman et al. |
| 2013/0163741 A1 | 6/2013 | Balasaygun et al. |
| 2013/0275164 A1 | 10/2013 | Gruber et al. |
| 2014/0024362 A1 | 1/2014 | Kang et al. |
| 2014/0029734 A1 | 1/2014 | Kim et al. |
| 2014/0037084 A1 | 2/2014 | Dutta |
| 2014/0107476 A1 | 4/2014 | Tung et al. |
| 2014/0122077 A1 | 5/2014 | Nishikawa et al. |
| 2014/0122618 A1 | 5/2014 | Duan |
| 2014/0146962 A1 | 5/2014 | Busayapongchai |
| 2014/0200928 A1 | 7/2014 | Watanabe et al. |
| 2014/0207882 A1 | 7/2014 | Joo et al. |
| 2014/0247933 A1 | 9/2014 | Soundar |
| 2014/0279050 A1 | 9/2014 | Makar et al. |
| 2014/0280464 A1 | 9/2014 | De Ding et al. |
| 2014/0310365 A1 | 10/2014 | Sample et al. |
| 2015/0139413 A1 | 5/2015 | Hewitt et al. |
| 2015/0142704 A1 | 5/2015 | London |
| 2015/0150019 A1 | 5/2015 | Sheaffer et al. |
| 2015/0201013 A1 | 7/2015 | Nonaka |
| 2015/0237203 A1 | 8/2015 | Siminoff |
| 2015/0248817 A1 | 9/2015 | Steir et al. |
| 2015/0281446 A1 | 10/2015 | Milstein et al. |
| 2015/0339707 A1 | 11/2015 | Harrison et al. |
| 2015/0347399 A1 | 12/2015 | Aue et al. |
| 2015/0350331 A1 | 12/2015 | Kumar |
| 2015/0358790 A1 | 12/2015 | Nasserbakht |
| 2016/0028891 A1 | 1/2016 | Pirat et al. |
| 2016/0105546 A1 | 4/2016 | Keys et al. |
| 2016/0139998 A1 | 5/2016 | Dunn et al. |
| 2016/0198045 A1 | 7/2016 | Kulkarni et al. |
| 2016/0212266 A1 | 7/2016 | Soundar |
| 2016/0227033 A1 | 8/2016 | Song |
| 2016/0227034 A1 | 8/2016 | Kulkarni et al. |
| 2016/0277569 A1 | 9/2016 | Shine et al. |
| 2016/0379230 A1 | 12/2016 | Chen |
| 2017/0037084 A1 | 2/2017 | Fasan |
| 2017/0039194 A1 | 2/2017 | Tschetter |
| 2017/0061091 A1 | 3/2017 | McElhinney et al. |
| 2017/0094052 A1 | 3/2017 | Zhang et al. |
| 2017/0177298 A1 | 6/2017 | Hardee et al. |
| 2017/0180499 A1 | 6/2017 | Gelfenbeyn et al. |
| 2017/0289332 A1 | 10/2017 | Lavian et al. |
| 2017/0358296 A1 | 12/2017 | Segalis et al. |
| 2017/0359463 A1 | 12/2017 | Segalis et al. |
| 2017/0359464 A1 | 12/2017 | Segalis et al. |
| 2017/0365277 A1 | 12/2017 | Park |
| 2018/0124255 A1 | 5/2018 | Kawamura et al. |
| 2018/0133900 A1 | 5/2018 | Breazeal et al. |
| 2018/0220000 A1 | 8/2018 | Segalis et al. |
| 2018/0227416 A1 | 8/2018 | Segalis et al. |
| 2018/0227417 A1 | 8/2018 | Segalis et al. |
| 2018/0227418 A1 | 8/2018 | Segalis et al. |
| 2018/0336449 A1 | 11/2018 | Adan et al. |
| 2018/0342241 A1 | 11/2018 | Qu |
| 2019/0281159 A1 | 9/2019 | Segalis et al. |
| 2019/0306314 A1 | 10/2019 | Segalis et al. |
| 2020/0042597 A1 | 2/2020 | Wu |
| 2021/0203784 A1 | 7/2021 | Konig |
| 2021/0243300 A1 | 8/2021 | Segalis et al. |
| 2022/0083908 A1 | 3/2022 | Sharifi et al. |

FOREIGN PATENT DOCUMENTS

| | | |
|---|---|---|
| CN | 106503646 A | 3/2017 |
| EP | 1679693 | 7/2006 |
| EP | 3618062 | 3/2020 |
| JP | 2004508748 | 3/2004 |
| JP | 2007219385 | 8/2007 |
| JP | 2007524928 | 8/2007 |

(56) References Cited

FOREIGN PATENT DOCUMENTS

| | | |
|---|---|---|
| JP | 2008015439 | 1/2008 |
| JP | 2008022406 A | 1/2008 |
| JP | 2009210703 | 9/2009 |
| JP | 2015070371 | 2/2015 |
| JP | 2015132987 A | 7/2015 |
| JP | 2016095582 A | 5/2016 |
| JP | 2018101847 A | 6/2018 |
| JP | 2019522914 A | 8/2019 |
| KR | 20130099423 | 9/2013 |
| KR | 20140121105 | 10/2014 |
| WO | 2007065193 | 6/2007 |
| WO | 2015020942 | 2/2015 |
| WO | 2014197635 | 12/2017 |

OTHER PUBLICATIONS

Leviathan, Yaniv et al.; Google Duplex: An AI System for Accomplishing Real-World Tasks Over the Phone; Google AI blog; 7 pages; dated 2018.

Davies, R. et al.; Automatic Context Determination for Answering User Queries; Technical Disclosure Commons; pp. 1-8; dated Feb. 2019.

Pradhan, Swadhin et al.; Understanding and Managing Notifications; IEEE; INFOCOM 2017—IEEE Conference on Computer Communications; pp. 1-9; dated May 2017.

Mehrotra, Abhinav et al.; Designing Content-driven Intelligent Notification; Mechanisms for Mobile Applications; Proceedings of the 2015 ACM International Joint Conference on Pervasive and Ubiquitous Computing (UBICOMP '15); pp. 813-824; dated Sep. 2015.

* cited by examiner

SYSTEM(S) AND METHOD(S) FOR IMPLEMENTING A PERSONALIZED CHATBOT

BACKGROUND

Humans (also referred to herein as "users") may engage in human-to-computer dialogs with interactive software applications referred to as "chatbots," "voice bots", "automated assistants", "interactive personal assistants," "intelligent personal assistants," "conversational agents," etc. via a variety of computing devices. As one example, these chatbots may correspond to a machine learning model or a combination of different machine learning models, and may be utilized to perform various tasks on behalf of users. For instance, some of these chatbots can conduct conversations with various users to perform action(s) or task(s) on behalf of users and/or on behalf of entities associated with the users. In some of these instances, the conversations can include voice-based conversations, such as conversations conducted locally at a computing device, conducted over multiple computing devices via a telephonic network, or other voice-based scenarios. In other instances, the conversations can include text-based conversations, such as conversations conducted via text or SMS messaging, email, and/or other text-based scenarios.

Notably, not only can some of these chatbots initiate these conversations to perform the action(s) or task(s), but some of these chatbots can also respond to other users that initiate these conversations. As one example, these chatbots can answer incoming telephone calls directed to a given user and engage in these conversations with an additional user that initiated incoming telephone calls. However, functionality of these chatbots is generally limited to ascertaining an identity of the additional user that initiated incoming telephone calls, ascertaining a certain reason why the additional user initiated incoming telephone calls, and/or other call screening functionalities. Put another way, these chatbots that can answer incoming telephone calls directed to the given user are generally not capable of performing the action(s) or task(s). As a result, these chatbots generally request that the user join the telephone calls and take over the conversations from these chatbots since they are not capable of not capable of performing the action(s) or task(s) on behalf of the given user.

SUMMARY

Implementations disclosed herein are directed to implementing a personalized chatbot on behalf of a user. For example, processor(s) of a client device of the user can receive a telephone call that is initiated by an additional user, and, in response to receiving the telephone call, identify an entity that is associated with the additional user, and determine, based on the entity that is associated with the additional user, whether to (1) fully automate the telephone call, or (2) partially automate the telephone call. In fully automating the telephone call, the processor(s) can cause a chatbot to engage in a corresponding conversation with the additional user and without prompting the user for any input. In partially automating the telephone call, the processor(s) can cause the chatbot to engage in a corresponding conversation with the additional user but with prompting the user for input(s) via suggestion chip(s). In some implementations, the processor(s) can additionally or alternatively determine whether to (3) refrain from automating the telephone call entirely. Accordingly, the chatbot is capable of performing action(s) or task(s) during the conversations without assistance from the user by fully automating the telephone call or with assistance from the user by partially automating the telephone call while still being able to defer completely to the user by refraining from automating the telephone call.

For example, assume that the additional user that initiated the telephone call is associated with Example Delivery Service—a fictitious parcel delivery service—and that the user is expecting a package to be delivered by Example Delivery Service. Based on the processor(s) identifying Example Delivery Service as the entity associated with the additional user, the processor(s) can determine to fully automate the telephone call on behalf of the user. In this example, the processor(s) can determine to fully automate the telephone call on behalf of the user based on tasks(s) and/or action(s) that Example Delivery Service, or other entities of the same type as Example Delivery Service (e.g., other parcel delivery services), typically request to be performed (e.g., requesting verification of a delivery address of the user, notifying the user of anticipated delivery or actual delivery, etc.), and the chatbot being capable of performing these task(s) and/or action(s). Additionally, or alternatively, the processor(s) can determine to fully automate the telephone call on behalf of the user and with Example Delivery Service based on determining that the user previously provided any user input (e.g., free-form natural language input, structured input via a contact entry associated with Example Delivery Service or the like, and/or other input) to indicate that the user is expecting the telephone call from the entity and that optionally includes instructions associated with an anticipated task or action to be requested by Example Delivery Service, such as a physical address information or a particular location associated with the physical address information to leave a package. Further, in causing the chatbot to engage in the corresponding conversation with the additional user and without prompting the user for any input, the processor(s) can cause instances of audio data capturing spoken utterance of the additional user to be processed (e.g., using on-device automatic speech recognition (ASR) model(s), on-device natural language understanding (NLU) model(s), and/or on-device fulfillment model(s) or rule(s)), and can generate corresponding instances of synthesized speech audio data that includes synthesized speech of the voice bot and that is generated based on processing the instances of audio data.

Notably, in generating the instances of synthesized speech audio data, the chatbot can leverage user data of the user of the client device that is accessible to the chatbot (and assuming that the user has authorized the chatbot to access the user data). The user data can include user profile data for the user of the client device, email data for the user of the client device, software application data for the user of the client device, and/or any other data that is personal to the user and that is accessible at the client device. Accordingly, in this example, if the additional user asks for a location to leave a package (e.g., requesting performance of a task to verify the delivery address of the user), the chatbot can leverage physical address information of the user stored in the user profile data for the user of the client device to generate a given instance of synthesized speech audio data that includes physical address information of the user. In these and other manners, the chatbot can fully automate the telephone call on behalf of the user and subsequently notify the user of a result of the conversation without even notifying the user of the telephone call.

As another example, assume that the additional user that initiated the telephone call is associated with Hypothetical Café—a fictitious restaurant—and that the user has a reservation at Hypothetical Café. Based on the processor(s) identifying Hypothetical Café as the entity associated with the additional user, the processor(s) can determine to partially automate the telephone call on behalf of the user. In this example, the processor(s) can determine to partially automate the telephone call on behalf of the user based on tasks(s) and/or action(s) that Hypothetical Café, or other entities of the same type as Hypothetical Café (e.g., other restaurants), typically request to be performed (e.g., reservation confirmation, change in availability of menu items from an online order, etc.), and the chatbot being capable of performing these task(s) and/or action(s), but that user inputs may be required to help the chatbot conduct the conversations. Additionally, or alternatively, the processor(s) can determine to partially automate the telephone call on behalf of the user and with Hypothetical Café based on determining that the user previously provided any user input (e.g., free-form natural language input, structured input via a contact entry associated with Example Delivery Service or the like, and/or other input) to indicate that the user is expecting the telephone call from the entity and that optionally includes instructions associated with an anticipated task or action to be requested by Hypothetical Café, such as an indication to confirm a reservation at Hypothetical Café. Further, in causing the chatbot to engage in the corresponding conversation with the additional user, the processor(s) can cause instances of audio data capturing spoken utterance of the additional user to be processed (e.g., using on-device automatic speech recognition (ASR) model(s), on-device natural language understanding (NLU) model(s), and/or on-device fulfillment model(s) or rule(s)), and can generate corresponding instances of synthesized speech audio data that includes synthesized speech of the voice bot.

However, in generating the instances of synthesized speech audio data, the chatbot may not be able to leverage the user data of the user of the client device that is accessible to the chatbot (even assuming that the user has authorized the chatbot to access the user data). Put another way, the user data may not indicate whether the user intends to use the reservation at Hypothetical Café. Nonetheless, and in partially automating the telephone call, the processor(s) can determine suggestion chip(s) to be provided for presentation to the user. These suggestion chip(s) can be determined based on processing the instances of audio data, and the instances of synthesized speech audio data can be generated based on receiving a user selection of the suggestion chip(s). Accordingly, in this example, if the additional user asks for the user to confirm whether the user intends to use the reservation, the chatbot can generate a "yes" suggestion chip and a "no" suggestion chip with respect to usage of the restaurant reservation. This enables the user to provide a single input (e.g., the user selection of the "yes" suggestion chip or the "no" suggestion chip) to cause the chatbot to handle the telephone call on behalf of the user. In these and other manners, the chatbot can partially automate the telephone call on behalf of the user and subsequently notify the user of a result of the conversation with minimal user intervention in the telephone call.

As yet another example, assume that the additional user that initiated the telephone call is associated with Kid's Day Care—a fictitious day care facility—and that the user has children that attend Kid's Day Care. Based on the processor(s) identifying Hypothetical Café as the entity associated with the additional user, the processor(s) can determine to refrain from automating the telephone call on behalf of the user. In this example, the processor(s) can determine to refrain from automating the telephone call on behalf of the user based on tasks(s) and/or action(s) that Kid's Day Care, or other entities of the same type as Kid's Day Care (e.g., other day care facilities or other users that are not associated with any type of business entity), typically request to be performed (e.g., personal task(s), etc.). Additionally, or alternatively, the processor(s) can determine to refrain from automating the telephone call on behalf of the user and with Kid's Day Care based on determining that the user previously provided any user input (e.g., free-form natural language input, structured input via a contact entry associated with Example Delivery Service or the like, and/or other input) to indicate no calls from Kid's Day Care should be automated. Although the chatbot may be capable of engaging in conversations with the additional user in this example, the user of the client device may be better suited to handle this telephone call. As a result, the chatbot can notify the user of the incoming call (e.g., by causing the telephone call to ring).

As noted above, in implementations where the processor(s) determine to partially automate the telephone call on behalf of the user, the suggestion chip(s) can be provided for presentation to the user. In some versions of these implementations, the suggestion chip(s) can be generic (e.g., the "yes" suggestion chip and the "no" suggestion chip described above), but the resulting instances of synthesized speech that are generated in response to receiving a user selection of a given suggestion ship may be tailored to the entity that is associated with the additional user. Put another way, a user selection of the same suggestion chip (e.g., the "yes" suggestion chip or the "no" suggestion chip described above) may result in different synthesized speech audio data being generated on an entity-by-entity basis or an entity type-by-entity type basis.

For instance, assume that the entity associated with the additional user is a restaurant entity and that the additional user is an employee of the restaurant entity calling to confirm a reservation. Further assume that the user is provided with the "yes" suggestion chip, and directed input to the "yes" suggestion chip to confirm the reservation. In this instance, the synthesized speech audio data may include speech of "[user] has confirmed the reservation". In contrast, assume that the entity associated with the additional user is a bank entity and that the additional user is an employee of the bank entity calling to confirm a recent purchase. Further assume that the user is provided with the "yes" suggestion chip, and directed input to the "yes" suggestion chip to confirm the reservation. In this instance, the synthesized speech audio data may include speech of "[user] made the purchase". In these instances, and although the suggestion chip includes the same content (e.g., "yes"), the resulting synthesized speech audio data that is generated differs in that it is contextualized with respect to the entity and the corresponding conversation.

By using techniques described herein, one or more technical advantages can be achieved. As one non-limiting example, techniques described herein deploy personalized chatbots that can answer calls on behalf of the users and dynamically adapt a level of interaction required by the users. This enables computational resources to be conserved at client devices while ensuring security of user data. For instance, in implementations where the telephone calls are fully automated on behalf of the users, the client device can cause a chatbot to be deployed in an on-device manner to handle the telephone call by leveraging user data. As a result, the user need not stop performance of an ongoing task at the client device to answer the telephone call or subsequently resume the ongoing task when the telephone call is concluded, thereby conserving computational resources at the client device and minimizing user distraction. Also, for instance, in implementations where the telephone calls are partially automated on behalf of the users, the client device can utilize the suggestion chip(s) and dynamically adapt the synthesized speech that is generated in response to a user selection of the suggestion chip(s). As a result, the user need only provide minimal input (e.g., single tap input) to enable the client device to handle the telephone call, thereby also conserving computational resources at the client device and minimizing user distraction.

The above description is provided as an overview of only some implementations disclosed herein. Those implementations, and other implementations, are described in additional detail herein.

DETAILED DESCRIPTION

Figure 1:
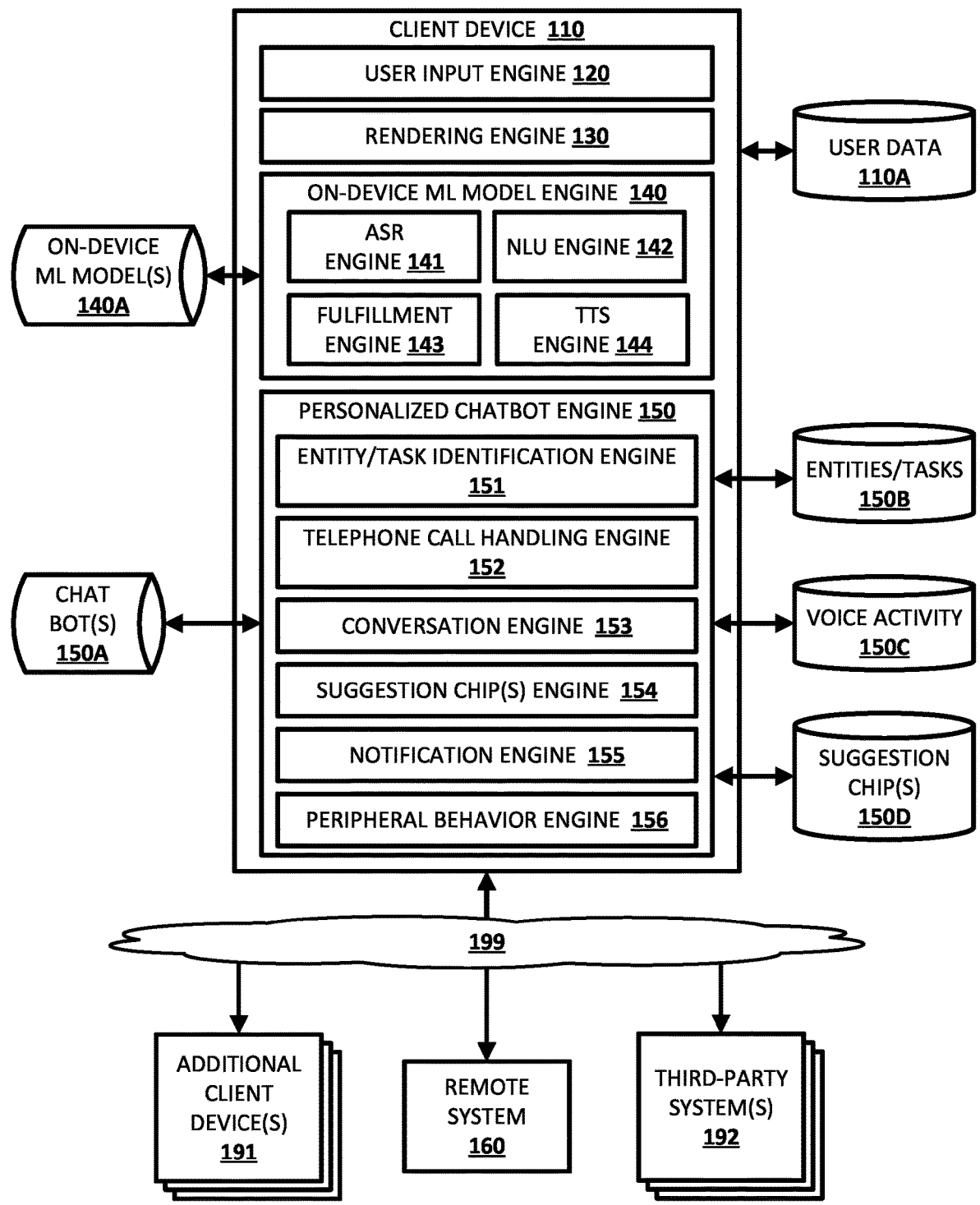
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, user input engine 120, rendering engine 130, on-device machine learning (ML) model engine 140, and personalized chatbot engine 150. The client device 110 can be, for example, a standalone device (e.g., having microphone(s), vision component(s), speaker(s), display(s), and/or other user interface components), a laptop, a desktop computer, a tablet, a wearable computing device, a vehicular computing device, and/or any other client device capable of implementing the personalized chatbot engine 150.

The user input engine 120 can detect various types of user input at the client device 110. In some examples, the user input detected at the client device 110 can include spoken input detected via microphone(s) of the client device 110. In these examples, the microphone(s) of the client device 110 can generate audio data that captures spoken utterance(s) included in the spoken input. In other examples, the user input detected at the client device 110 can include touch input detected via user interface input device(s) (e.g., touch sensitive display(s)) of the client device 110, and/or typed input detected via user interface input device(s) (e.g., touch sensitive display(s) and/or keyboard(s)) of the client device 110. In these examples, the user interface input device(s) of the client device 110 can generate textual data that captures the touch input and/or the typed input.

The rendering engine 130 can cause content (e.g., suggestion chip(s), notification(s), and/or other content described herein) to be provided for presentation to the user of the client device 110. For example, the rendering engine 130 can cause content to be visually rendered for presentation to the user at the client device 110 (e.g., via a touch sensitive display or other user interface output device(s)). Further, the rendering engine 130 can cause content to be audibly rendered for presentation to the user at the client device 110 (e.g., via speaker(s) or other user interface output device(s)).

The on-device ML model engine 140 can include, in various implementations, an automatic speech recognition (ASR) engine 141, a natural language understanding (NLU) engine 142, a fulfillment engine 143, and a text-to-speech (TTS) engine 144. As described in more detail below, these on-device ML model engines of the on-device ML model engine 140 may utilize various on-device ML models (e.g., stored in on-device ML model(s) database 140A) to process various user inputs (e.g., received via the user input engine 120) and to generate various outputs (e.g., to be visually and/or audibly rendered for presentation to the user via the rendering engine 130 and/or at respective additional client device(s) 191 of additional users).

Further, the client device 110 is illustrated in FIG. 1 as communicatively coupled to a remote system 160 over one or more networks 199 (e.g., any combination of Wi-Fi, Bluetooth, or other local area networks (LANs); ethernet, the Internet, or other wide area networks (WANs); and/or other networks). The remote system 160 can include, in various implementations, cloud-based counterparts of the engines of the client device 110 or a subset thereof. The remote system 160 can be, for example, a high-performance server, a cluster of high-performance servers, and/or any other computing device that is remote from the client device 110. In implementations described herein, on-device processing using the various engines of the client device 110 may be prioritized at least due to latency considerations, data security considerations, and/or other considerations.

In various implementations, the user of the client device 110 can provide user inputs (e.g., detected via the user input engine 120) to initiate telephone calls with entities, and the user of the client device 110 can receive incoming telephone calls from the additional users via the respective additional client device(s) 191. The telephone calls described herein can be performed using various voice communication protocols including, for example, Voice over Internet Protocol (VoIP), public switched telephone network (PSTN), and/or other telephonic communication protocols. In some versions of those implementations, the user can provide user inputs to initiate the telephone calls described herein on behalf of himself or herself. In other versions of those implementations, the user can provide user inputs directed to the client device 110, or a chatbot executing locally at the client device 110 (e.g., and that is stored in chatbot(s) database 150A), to initiate the telephone calls described herein on behalf of the user. In some versions of those implementations, the user can provide user inputs to answer the incoming telephone calls described herein on behalf of himself or herself. In other versions of those implementations, the user can direct the client device 110, or the chatbot executing locally at the client device 110, to answer the telephone calls described herein on behalf of the user.

Notably, the chatbot can be provided by a first-party, but can implement techniques described herein as a service to various third-parties (e.g., implemented by third-party system(s) 192 that are communicatively coupled to the client device 110 and/or the remote system 160 over the one or more networks 199). As used herein, the term first-party refers to an entity that publishes and/or manages the chatbot, whereas the term third-party refers to an entity that is distinct from the entity that publishes and/or manages the chatbot.

In various implementations, the client device 110 and/or the chatbot can leverage the on-device ML model engine 140 in processing the various user inputs received at the client device 110 and/or in generating the various outputs to be provided for presentation to the user at the client device 110 and/or the additional users at the respective additional client device(s) 191. Each of the sub-engines of the on-device ML model engine 140 may be configured to perform one or more functions.

For example, the ASR engine 141 can process, using ASR model(s) stored in the on-device ML model(s) database 140A (e.g., a recurrent neural network (RNN) model, a transformer model, and/or any other type of ML model capable of performing ASR), audio data that captures spoken utterances and that is generated by microphone(s) of the client device 110 to generate ASR output. Further, the NLU engine 142 can process, using NLU model(s) stored in the on-device ML model(s) database 140A (e.g., a long short-term memory (LSTM), gated recurrent unit (GRU), and/or any other type of RNN or other ML model capable of performing NLU) and/or NLU rule(s), the ASR output (or other typed or touch inputs received via the user input engine 120 of the client device 110) to generate NLU output. Moreover, the fulfillment engine 143, using fulfillment model(s) and/or fulfillment rules stored in the on-device ML model(s) database 140A, the NLU data to generate fulfillment output. Additionally, the TTS engine 144 can process, using TTS model(s) stored in the on-device ML model(s) database 140A, textual data (e.g., text formulated by a chatbot) to generate synthesized speech audio data that includes computer-generated synthesized speech corresponding to the textual data.

In various implementations, the ASR output can include, for example, a plurality of speech hypotheses (e.g., term hypotheses and/or transcription hypotheses) for spoken utterances based on the processing of the audio data, and can optionally select a particular speech hypotheses as recognized text for the spoken input based on a corresponding value associated with each of the plurality of speech hypotheses (e.g., probability values, log likelihood values, and/or other values). In various implementations, the ASR model(s) stored in the on-device ML model(s) database 140A are end-to-end speech recognition model(s), such that the ASR engine 141 can generate the plurality of speech hypotheses directly using the model. For instance, the ASR model(s) can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms.

In other implementations, the ASR model(s) stored in the on-device ML model(s) database 140A are not end-to-end speech recognition model(s) such that the ASR engine 141 can instead generate predicted phoneme(s) (and/or other representations). For instance, the predicted phoneme(s) (and/or other representations) may then be utilized by the ASR engine 141 to determine a plurality of speech hypotheses that conform to the predicted phoneme(s). In doing so, the ASR engine 141 can optionally employ a decoding graph, a lexicon, and/or other resource(s).

In various implementations, the NLU output can include, for example, annotated recognized text that includes one or more annotations of the recognized text for one or more (e.g., all) of the terms of the recognized text. For example, the NLU engine 142 may include a part of speech tagger (not depicted) configured to annotate terms with their grammatical roles. Additionally, or alternatively, the NLU engine 142 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person, particular place or location of entity that is associated with multiple locations, etc.). The entity tagger may rely on content of user inputs to resolve a particular entity and/or may optionally communicate with a knowledge graph or other entity database to resolve a particular entity.

Additionally, or alternatively, the NLU engine 142 may include a coreference resolver (not depicted) configured to group, or "cluster," references to the same entity based on one or more contextual cues. For example, the coreference resolver may be utilized to resolve the term "them" to "buy theater tickets" in the user input "buy them", based on "theater tickets" being mentioned in a client device notification rendered immediately prior to receiving input "buy them". In some implementations, one or more components of the NLU engine 142 may rely on annotations from one or more other components of the NLU engine 142. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data of the user of the client device 110 in coreference resolution and/or entity resolution.

In various implementations, the fulfillment output can include, for example, one or more tasks to be performed by the client device 110 and/or the chatbot executing locally at the client device 110 and on behalf of the user of the client device 110. As described in more detail herein (e.g., with respect to FIGS. 4A, 4B, 4C, 5A, and 5B), the user of the client device 110 can cause the client device 110 and/or the chatbot executing locally at the client device 110 to handle incoming telephone calls directed to the user of the client device 110. In particular, the client device 110 and/or the chatbot executing locally at the client device 110 can utilize the personalized chatbot engine 150 to determine whether to (1) fully automate the incoming telephone call on behalf of the user of the client device 110, (2) partially automate the incoming telephone call on behalf of the user of the client device, or (3) refrain from automating the incoming telephone call on behalf of the user of the client device 110, and handle the incoming telephone call based on the determination (e.g., as described with respect to FIG. 3). Further, and in response to determining to partially automate the incoming telephone call on behalf of the user of the client device 110, the client device 110 and/or the chatbot executing locally at the client device 110 can utilize the personalized chatbot engine 150 to dynamically adapt synthesized speech audio data to be provided for presentation to an additional user (e.g., via the respective additional client device(s) 191) in response to receiving a user selection of a given suggestion chip and based on an entity that is associated with the additional user. Accordingly, it should be understood that the fulfillment output may be dependent on the corresponding conversations and/or the task(s) on behalf of the user of the client device 110 and/or the chatbot executing locally at the client device 110.

In various implementations, the TTS engine 144 can generate synthesized speech audio data that captures computer-generated synthesized speech. The synthesized speech audio data can be rendered at the client device 110 via speaker(s) of the client device 110 and/or rendered at the respective additional client device(s) 191 via respective speaker(s) of the additional client device(s). The synthesized speech may include any output generated by the chatbot described herein, and may include, for example, synthesized speech generated as part of a dialog.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 and/or the remote system 160 (e.g., over the one or more networks 199). As another example, a given client device can be utilized by multiple users in a shared setting (e.g., a group of users, a household, etc.).

The personalized chatbot engine 150 may include, in various implementations, entity/task identification engine 151, telephone call handling engine 152, conversation engine 153, suggestion chip(s) engine 154, notification engine 155, and peripheral behavior engine 156 as depicted in FIG. 1. Further, the personalized chatbot engine 150 may have access to various databases, such as user data database 110A, chatbot(s) database 150A, entities/tasks database 150B, voice activity database 150C, and suggestion chip(s) database 150D. Although the personalized chatbot engine 150 is depicted as having particular sub-engines and as having access to particular databases, it should be understood that is for the sake of example and is not meant to be limiting. For example, one or more of the sub-engines and/or one or more of the databases depicted in FIG. 1 may be combined, while one or more other sub-engines engines and/or one or more of the databases depicted in FIG. 1 may be omitted. Additional description of the personalized chatbot engine 150 and its various sub-engines and databases is provided with respect to FIGS. 2, 3, 4A, 4B, 4C, 5A, and 5B.

Figure 2:
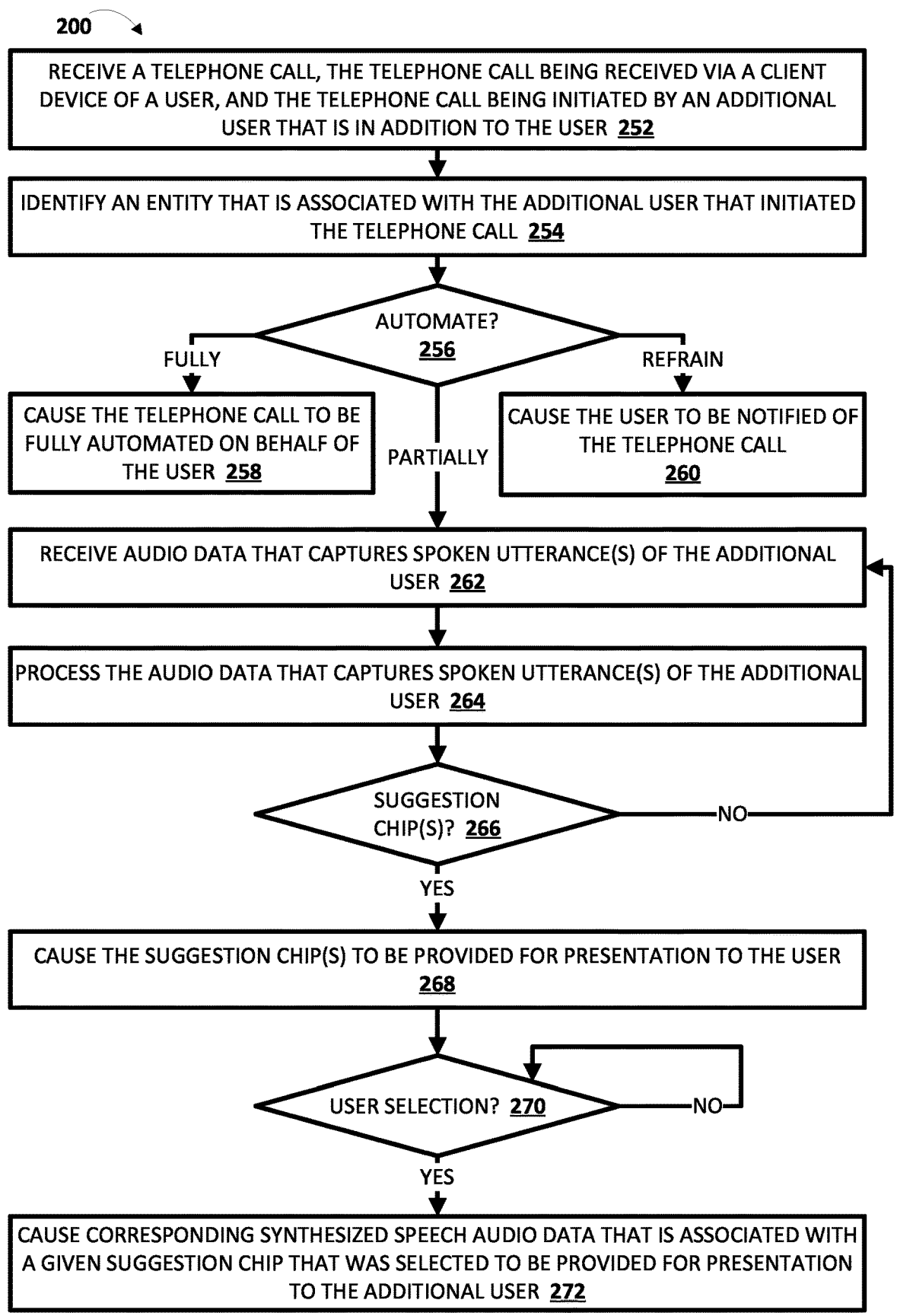
FIG. 2 depicts a flowchart illustrating an example method of determining whether to (1) fully automate a telephone call on behalf of a user, (2) partially automate the telephone call on behalf of the user, or (3) refrain from automating the telephone call on behalf of the user, and handling the telephone call based on the determination, in accordance with various implementations.

Turning now to FIG. 2, a flowchart illustrating an example method 200 of determining whether to (1) fully automate a telephone call on behalf of a user, (2) partially automate the telephone call on behalf of the user, or (3) refrain from automating the telephone call on behalf of the user, and handling the telephone call based on the determination is depicted. For convenience, the operations of the method 200 are described with reference to a system that performs the operations. This system of the method 200 includes one or more processors and/or other component(s) of computing device(s) (e.g., client device 110 of FIGS. 1, 4A, 4B, 4C, 5A, and 6B, remote system 160 of FIG. 1, and/or computing device 810 of FIG. 8). Moreover, while operations of the method 200 are shown in a particular order, this is not meant to be limiting. One or more operations may be reordered, omitted, and/or added.

At block 252, the system receives a telephone call, the telephone call being received via a client device of a user, and the telephone call being initiated by an additional user that is in addition to the user. For example, the additional user can initiate the telephone call via an additional client device of the additional user. The additional client device of the additional user may be associated with a telephone number, and the additional user may or may not be stored in association with a contact entry of the user.

At block 254, the system identifies an entity that is associated with the additional user that initiated the telephone call. For example, the system can cause the entities/task identification engine 151 to identify the entity that is associated with the additional user that initiated the telephone call. In some implementations, the system can cause the entities/task identification engine 151 to identify the entity based on the telephone number that is associated with the additional client device of the additional user being stored in association with the entity in one or more databases (e.g., in the entities/task database 150B). In additional or alternative implementations, the system can cause the entities/task identification engine 151 to identify the entity based on the additional user being stored in association with a reference to the entity in a contact entry (e.g., in the user data database 110A).

Notably, the entities and the types of entities described herein can be defined with varying degrees of granularity. For example, the types of entities can include a person type of entity, a business type of entity, a location type of entity, and/or other types of entities. Further, the person type of entity can include a friend type of entity, a family member type of entity, a co-worker type of entity, and/or other particular types of person entities. Moreover, a business type of entity can include a restaurant type of entity, an airline type of entity, a hotel type of entity, a salon type of entity, and/or other particular types of business entities. Additionally, a location type of entity can be a school type of entity, a museum type of entity, a library type of entity, a park type of entity, and/or other particular types of location entities. Each entity may be indexed by these varying degrees of granularity in one or more databases (e.g., the entities/tasks database 150A) or a knowledge graph along with tasks that are typically associated with the entities. Accordingly, the entity/task identifying engine 151 can identify a specific entity for the identified entity, or a type of entity to which the identified entity belongs. For example, a specific entity for a person entity can be a name of the person (e.g., Jane Doe, John Doe etc.) that belongs to the person type of entity, a specific entity for a business entity can be a name of the business (e.g., Hypothetical Airlines, Example Airlines, etc.) that belong to the business type of entity or particular sector of the business type of entity, and so on.

At block 256, the system determines whether to (1) fully automate the telephone call on behalf of the user, (2) partially automate the telephone call on behalf of the user, or (3) refrain from automating the telephone call on behalf of the user. For example, in some implementations, the system can cause the telephone call handling engine 152 to determine, based on the entity identified at block 254 or a type of the entity identified at block 254, whether to (1) fully automate the telephone call on behalf of the user, (2) partially automate the telephone call on behalf of the user, or (3) refrain from automating the telephone call on behalf of the user. For instance, the telephone call handling engine 152 can access the entities/tasks database 150B to obtain a mapping of entities and whether to (1) fully automate the telephone call on behalf of the user, (2) partially automate the telephone call on behalf of the user, or (3) refrain from automating the telephone call on behalf of the user. In these instances, some entities or particular types of entities can be mapped to fully automating the telephone call on behalf of the user, whereas some other entities or other particular types of entities can be mapped to partially automating the telephone call on behalf of the user, and whereas yet some other entities or yet some other particular types of entities can be mapped to refraining from automating the telephone call on behalf of the user.

As another example, in additional or alternative implementations, the telephone call handling engine 152 can access the entities/tasks database 150B to determine whether the user has previously provided any user input that includes rules or triggers with respect to the entity that indicate the system should cause the chatbot to (1) fully automate the telephone call on behalf of the user, (2) partially automate the telephone call on behalf of the user, or (3) refrain from automating the telephone call on behalf of the user. The user input that includes the rules or triggers can include information associated with anticipated task(s) to be requested by the entity, temporal conditions for how long to employ the rules or triggers for the entity (e.g., the next two hours, the rest of the day, the rest of the week, always, etc.), and/or any other information to enable the system to more efficiently handle the telephone call with the entity. Notably, the user input can be detected via the user input engine 120, and can be provided by the user in various manners on an entity-by-entity basis (e.g., if the user input specifies to automate all telephone calls with the entity or to refrain from automating the telephone call with the entity) or on a more general basis (e.g., if the user input specifies to automate all telephone calls or to automate all telephone calls but for a subset of entities). In some instances, the user input can be spoken or typed free-form natural language input, whereas in other instances the user input can be spoken or typed structured input that is provided via a contacts application that includes a field for handling automated telephone calls for the entity.

As another example, in additional or alternative implementations, the system can cause the telephone call handling engine 152 to determine, based on user state of the user of the client device or a device state of the client device, whether to (1) fully automate the telephone call on behalf of the user, (2) partially automate the telephone call on behalf of the user, or (3) refrain from automating the telephone call on behalf of the user. For instance, if the user is in a meeting or actively using the client device to communicate with another user, or the client device is in a "do not disturb" state or "driving" state, then the telephone call handling engine 152 to determine fully automate the telephone call on behalf of the user. Notably, in some versions of these implementations, the telephone call handling engine 152 can determine to fully automate the telephone call on behalf of the user had the telephone call handling engine 152 determined to partially automate the telephone call on behalf of the user but for the user state and/or the device state. Similarly, the telephone call handling engine 152 can determine to partially automate the telephone call on behalf of the user had the telephone call handling engine 152 determined to refrain from automating the telephone call on behalf of the user but for the user state and/or the device state.

As another example, in additional or alternative implementations, the system can cause the telephone call handling engine 152 to determine, based on prior conversations during prior telephone calls (e.g., stored in the voice activity database 150C), whether to (1) fully automate the telephone call on behalf of the user, (2) partially automate the telephone call on behalf of the user, or (3) refrain from automating the telephone call on behalf of the user. For instance, if the user has previously engaged in one or more prior conversations with the entity or an additional entity that is of the same type of entity (and assuming that the user has authorized the system to access the user data), then the telephone call handling engine 152 can determine to fully automate the telephone call on behalf of the user in the same or similar manner in which the user previously conducted the one or more prior conversations.

If, at an iteration of block 256, the system determines to (1) fully automate the telephone call on behalf of the user, the system proceeds to block 258. At block 258, the system causes the telephone call to be fully automated on behalf of the user. In fully automating the telephone call on behalf of the user, the system can cause a chatbot (e.g., stored in the chatbot(s) database 150A) to engage in a conversation with the additional user and using the conversation engine 153, the notification engine 155, and/or the peripheral behavior engine 156. The chatbots described herein can include any chatbot that is capable of being implemented locally at the client device (including, but not limited to, transformer-based chatbots, such as a large language model (LLM), and/or other chatbots) and that is trained in any suitable manner (rules-based chatbots, example-based chatbots, natural language description-based chatbots). Notably, the chatbots described herein are capable of being utilized in conducting generalized aspects of conversations and can be further trained and/or fine-tuned based on the one or more prior conversations. Further, the system can cause the conversation engine 152 to utilize the peripheral behavior engine 156 in implementing various peripheral behaviors that reflect some of these generalized aspects of conversation. These peripheral behaviors can include, for example, greetings behaviors that enable the chatbot to identify the user and/or to identify itself as a chatbot, on hold behaviors that enable the chatbot to pause and resume the conversation, bailout behaviors that enable the chatbot to terminate the conversation with the additional user, and/or other peripheral behaviors. Fully automating the telephone call on behalf of the user is described in more detail herein (e.g., with respect to FIG. 4A).

If, at an iteration of block 256, the system determines to (3) refrain from automating the telephone call on behalf of the user, the system proceeds to block 260. At block 260, the system causes the user to be notified of the telephone call. In refraining from automating the telephone call on behalf of the user, the system can cause the client device to ring or some other notification to be provided for presentation to the user and using the notification engine 155. Refraining from automating the telephone call on behalf of the user is described in more detail herein (e.g., with respect to FIG. 4A).

If, at an iteration of block 256, the system determines to (2) partially automate the telephone call on behalf of the user, the system proceeds to block 262. At block 262, the system receives audio data that captures one or more spoken utterances. At block 264, the system processes the audio data that captures the one or more spoken utterances of the additional user. For example, the system can cause the conversation engine 152 to leverage the on-device ML Model engine 140 in processing the audio data. For instance, the conversation engine 152 can cause the ASR engine 141 to process, using the ASR model(s) stored in the on-device ML model(s) database 140A, the audio data to generate ASR output. Further, the conversation engine 152 can cause the NLU engine 142 to process, using the ASR model(s) stored in the on-device ML model(s) database 140A, the ASR output to generate NLU output. Moreover, the conversation engine 152 can cause the fulfillment engine 143 to process, using fulfillment model(s) and/or rule(s) stored in the on-device ML model(s) database 140A, the NLU output to generate fulfillment output.

At block 266, the system determines whether to cause one or more suggestion chips to be provided for presentation to the user and based on the one or more spoken utterances of the additional user that initiated the telephone call. If, at an iteration of block 266, the system determines not to cause the one or more suggestion chips to be provided for presentation to the user, then the system returns to block 262. If, at an iteration of block 266, the system determines to cause the one or more suggestion chips to be provided for presentation to the user, then the system proceeds to block 268.

For example, the system can cause the suggestion chip(s) engine 154 to determine whether to cause one or more of the suggestion chips to be provided for presentation to the user based on the ASR output, the NLU output, and/or the fulfillment output generated based on processing the one or more spoken utterances. For instance, if the system determines that the additional user is requesting that the user perform a task (e.g., determined by the entities/task identification engine 151 and based on the ASR output, the NLU output, and/or the fulfillment output), then the system can determine to provide one or more of the suggestion chips (e.g., stored in the suggestion chips database 150D) for presentation to the user. The one or more suggestion chips can be tailored to the request, and are described in more detail herein (e.g., with respect to FIGS. 4B, 5A, and 5C). Otherwise, the system can continue receiving and processing the audio data. Notably, and although not depicted in FIG. 2 for the sake of simplicity, the system can generate synthesized speech audio data that is responsive to the one or more spoken utterances captured in each instance of the audio data (e.g., via the TTS engine 144).

At block 268, the system causes the one or more suggestion chips to be provided for presentation to the user. The one or more suggestion chips can be provided for visual presentation to the user via a display of the client device or an additional client device of the user and/or can be provided for audible presentation to the user via speaker(s) of the client device or an additional client device of the user. Each of the one or more suggestion chips can be selectable to cause the chatbot engaged in the conversation with the additional user to satisfy the request provided by the additional user. In some implementations, the one or more suggestion chips can be provided for presentation to the user along with a transcription of the conversation between the chatbot and the additional user. This contextualizes the one or more suggestion chips with respect to the conversation.

At block 270, the system determines whether a user selection of a given suggestion chip, of the one or more suggestion chips, is received. The user selection can be a voice selection, a touch selection, or another type of selection. If, at an iteration of block 270, the system determines that no user selection of any suggestion chip, of the one or more suggestion chips, is received, then the system continues monitoring for a user selection of a given suggestion chip at block 270. If no user selection is received within a threshold amount of time, then the chatbot can cause the telephone call to be terminated. If, at an iteration of block 270, the system determines that a user selection of a given suggestion chip, of the one or more suggestion chips, is received, then the system proceeds to block 272.

At block 272, the system causes corresponding synthesized speech audio data that is associated with a given suggestion chip that was selected to be provided for presentation to the additional user. The synthesized speech audio data can be provided for audible presentation to the additional user via speaker(s) of an additional client device of the additional user. For example, the synthesized speech audio data can be generated based on content of the given suggestion chip and based on the entity that is associated with the additional user. Notably, and as described with respect to FIG. 3, the synthesized speech audio data can be dynamically adapted based on the entity that is associated with the additional user. Put another way, a user selection of the same given suggestion chip while the chatbot is engaged in conversations with additional users associated with different entities of different types can cause different synthesized speech audio data to be provided for presentation to the additional user.

Figure 3:
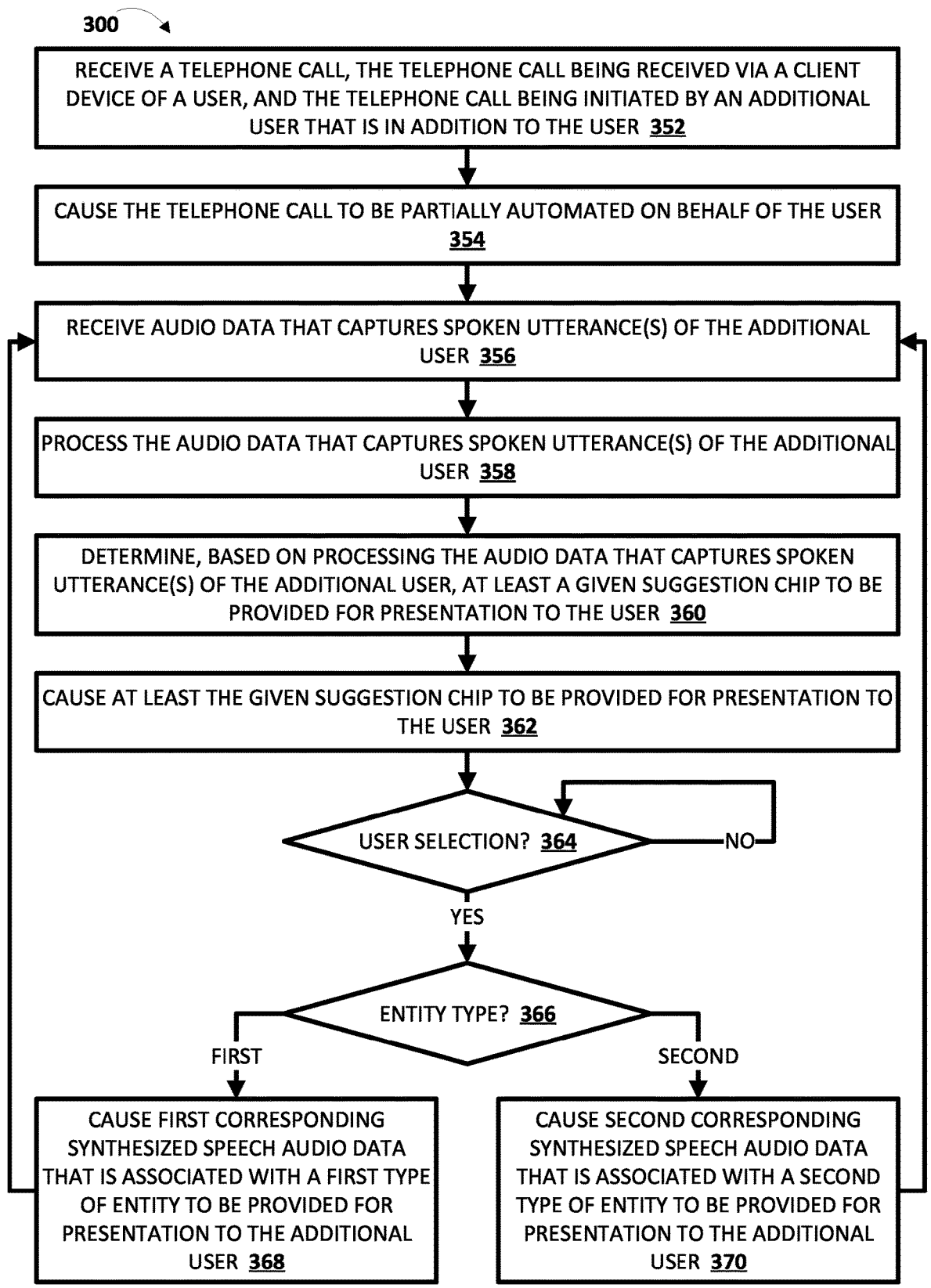
FIG. 3 depicts a flowchart illustrating an example method of dynamically adapting synthesized speech audio data to be provided for presentation to an additional user in response to receiving a user selection of a given suggestion chip and based on an entity that is associated with the additional user, in accordance with various implementations.

Turning now to FIG. 3, a flowchart illustrating an example method 300 of dynamically adapting synthesized speech audio data to be provided for presentation to an additional user in response to receiving a user selection of a given suggestion chip and based on an entity that is associated with the additional user is depicted. For convenience, the operations of the method 300 are described with reference to a system that performs the operations. This system of the method 300 includes one or more processors and/or other component(s) of computing device(s) (e.g., client device 110 of FIGS. 1, 4A, 4B, 4C, 5A, and 6B, remote system 160 of FIG. 1, and/or computing device 810 of FIG. 8). Moreover, while operations of the method 300 are shown in a particular order, this is not meant to be limiting. One or more operations may be reordered, omitted, and/or added.

At block 352, the system receives a telephone call, the telephone call being received via a client device of a user, and the telephone call being initiated by an additional user that is in addition to the user. For example, the additional user can initiate the telephone call via an additional client device of the additional user. The additional client device of the additional user may be associated with a telephone number, and the additional user may or may not be stored in association with a contact entry of the user.

At block 354, the system causes the telephone call to be partially automated on behalf of the user. For example, the system can cause the telephone call handling engine 152 to determine to cause the telephone call to be partially automated on behalf of the user based on one or more of the signals described with respect to block 256 of the method 200 of FIG. 2.

At block 356, the system receives audio data that captures one or more spoken utterances of the additional user. At block 358, the system processes the audio data that captures the one or more spoken utterances of the additional user. For example, the system can cause the conversation engine 152 to leverage the on-device ML Model engine 140 in processing the audio data. For instance, the conversation engine 152 can cause the ASR engine 141 to process, using the ASR model(s) stored in the on-device ML model(s) database 140A, the audio data to generate ASR output. Further, the conversation engine 152 can cause the NLU engine 142 to process, using the ASR model(s) stored in the on-device ML model(s) database 140A, the ASR output to generate NLU output. Moreover, the conversation engine 152 can cause the fulfillment engine 143 to process, using fulfillment model(s) and/or rule(s) stored in the on-device ML model(s) database 140A, the NLU output to generate fulfillment output.

At block 360, the system determines, based on processing the audio data that captures the one or more spoken utterances of the additional user, at least a given suggestion chip to be provided for presentation to the user. For example, the system can cause the suggestion chip(s) engine 154 to determine that at least the given suggestion chip should be provided for presentation to the user based on the ASR output, the NLU output, and/or the fulfillment output generated based on processing the one or more spoken utterances. For instance, if the system determines that the additional user is requesting that the user perform a task (e.g., determined by the entities/task identification engine 151 and based on the ASR output, the NLU output, and/or the fulfillment output), then the system can determine to provide at least the given suggestion chip (e.g., stored in the suggestion chips database 150D) for presentation to the user. The given suggestion chip can be tailored to the request, and is described in more detail herein (e.g., with respect to FIGS. 4B, 5A, and 5C). Otherwise, the system can continue receiving and processing the audio data. Notably, and although not depicted in FIG. 2 for the sake of simplicity, the system can generate synthesized speech audio data that is responsive to the one or more spoken utterances captured in each instance of the audio data (e.g., via the TTS engine 144).

At block 362, the system causes at least the given suggestion chip to be provided for presentation to the user. The given suggestion chip can be provided for visual presentation to the user via a display of the client device or an additional client device of the user and/or can be provided for audible presentation to the user via speaker(s) of the client device or an additional client device of the user. The given suggestion chip can be selectable to cause the chatbot engaged in the conversation with the additional user to satisfy the request provided by the additional user. In some implementations, the given suggestion chip can be provided for presentation to the user along with a transcription of the conversation between the chatbot and the additional user. This contextualizes the one or more suggestion chips with respect to the conversation.

At block 364, the system determines whether a user selection of the given suggestion chip is received. The user selection can be a voice selection, a touch selection, or another type of selection. If, at an iteration of block 364, the system determines that no user selection of the given suggestion chip is received, then the system continues monitoring for a user selection of the given suggestion chip at block 364. If no user selection is received within a threshold amount of time, then the chatbot can cause the telephone call to be terminated. If, at an iteration of block 364, the system determines that a user selection of the given suggestion chip is received, then the system proceeds to block 366.

At block 366, the system determines a type of entity that is associated with the additional user. For example, the system can cause the entities/task identification engine 151 to determine a type of the entity that is associated with the additional user. As described herein (e.g., with respect to block 254 of the method 200 of FIG. 2), the entities and the types of entities described herein can be defined with varying degrees of granularity.

If, at an iteration of block 366, the system determines that the type of entity that is associated with the additional user is a first type of entity, then the system proceeds to block 368. At block 368, the system causes first corresponding synthesized speech audio data that is associated with a first type of entity to be provided for presentation to the additional user. If, at an iteration of block 366, the system determines that the type of entity that is associated with the additional user is a second type of entity, then the system proceeds to block 370. At block 370, the system causes second corresponding synthesized speech audio data that is associated with a second type of entity to be provided for presentation to the additional user. Notably, the second corresponding synthesized speech audio data differs from the first corresponding synthesized speech audio data.

Put another way, the system dynamically adapts the synthesized speech audio data that is provided for presentation to the additional user based on the type of entity that the additional user is associated with even though the given suggestion chip that is provided for presentation to the user is the same. This enables the selection of the suggestion chip to convey the same sentiment, but in a context of the conversation with the additional user. Dynamically adapting the synthesized speech audio data is described in more detail herein (e.g., with respect to FIGS. 5A and 5B).

Although the method 300 of FIG. 3 is described with respect to determining the type of entity that is associated with the additional user from among the first type of entity and the second type of entity, it should be understood that is for the sake of example to illustrate various techniques and is not meant to be limiting. Rather, it should be understood that block 366 of the method 300 of FIG. 3 may consider additional or alternative types of entities with varying degrees of granularity.

Figure 4A:
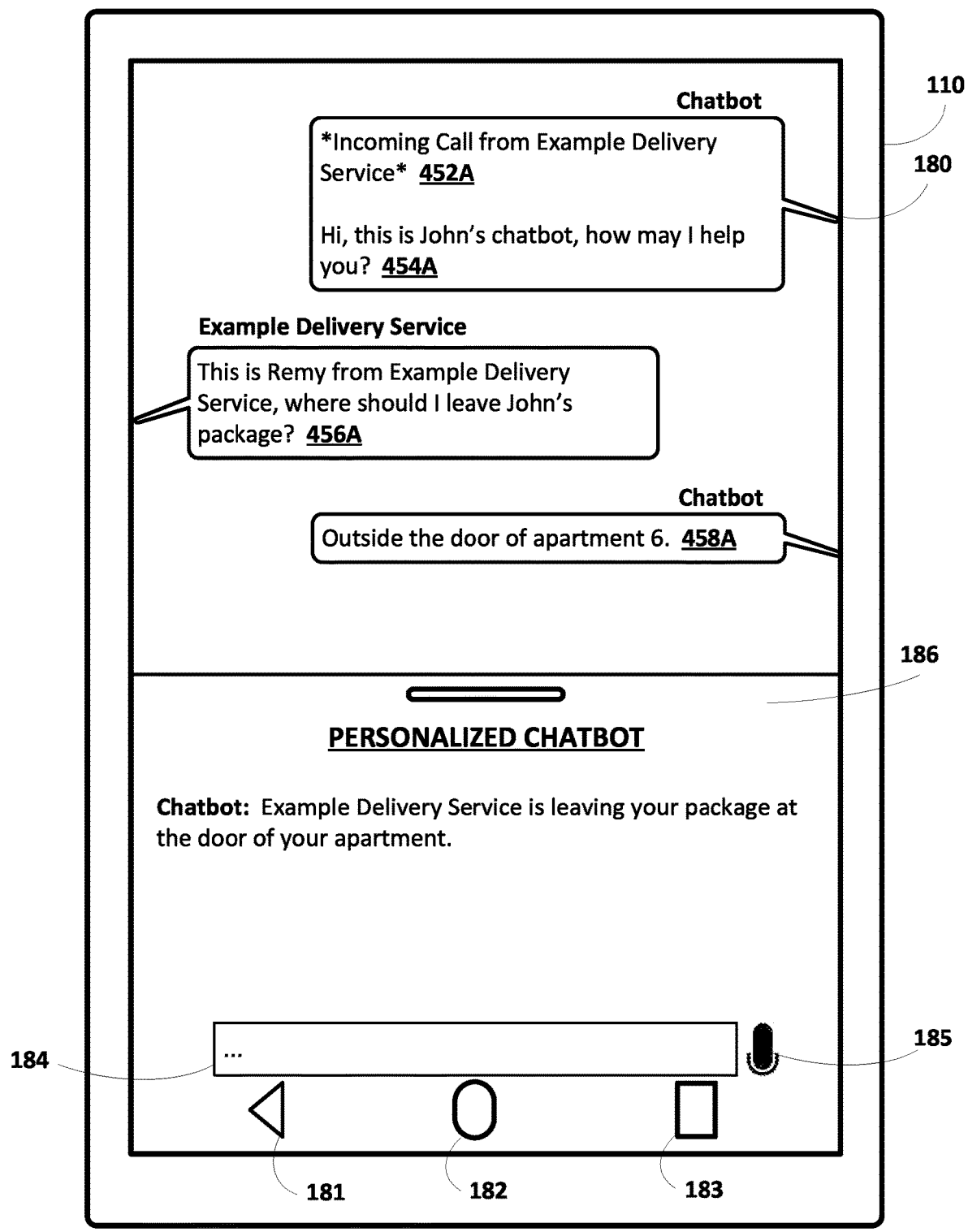
FIG. 4A, FIG. 4B, and FIG. 4C depict non-limiting examples of determining whether to (1) fully automate a telephone call on behalf of a user, (2) partially automate the telephone call on behalf of the user, or (3) refrain from automating the telephone call on behalf of the user, and handling the telephone call based on the determination, in accordance with various implementations.
Figure 4B:
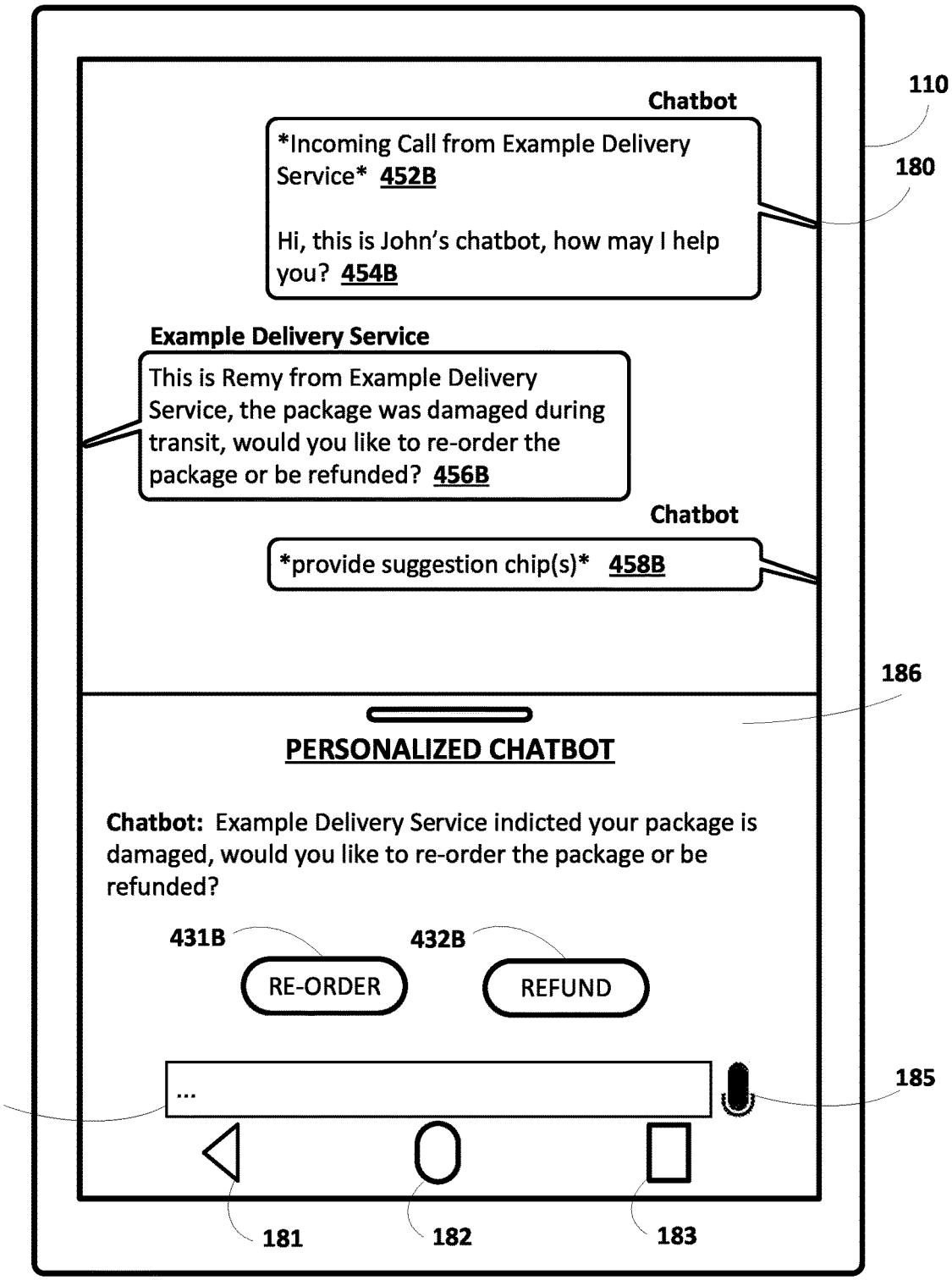
Figure 4C:
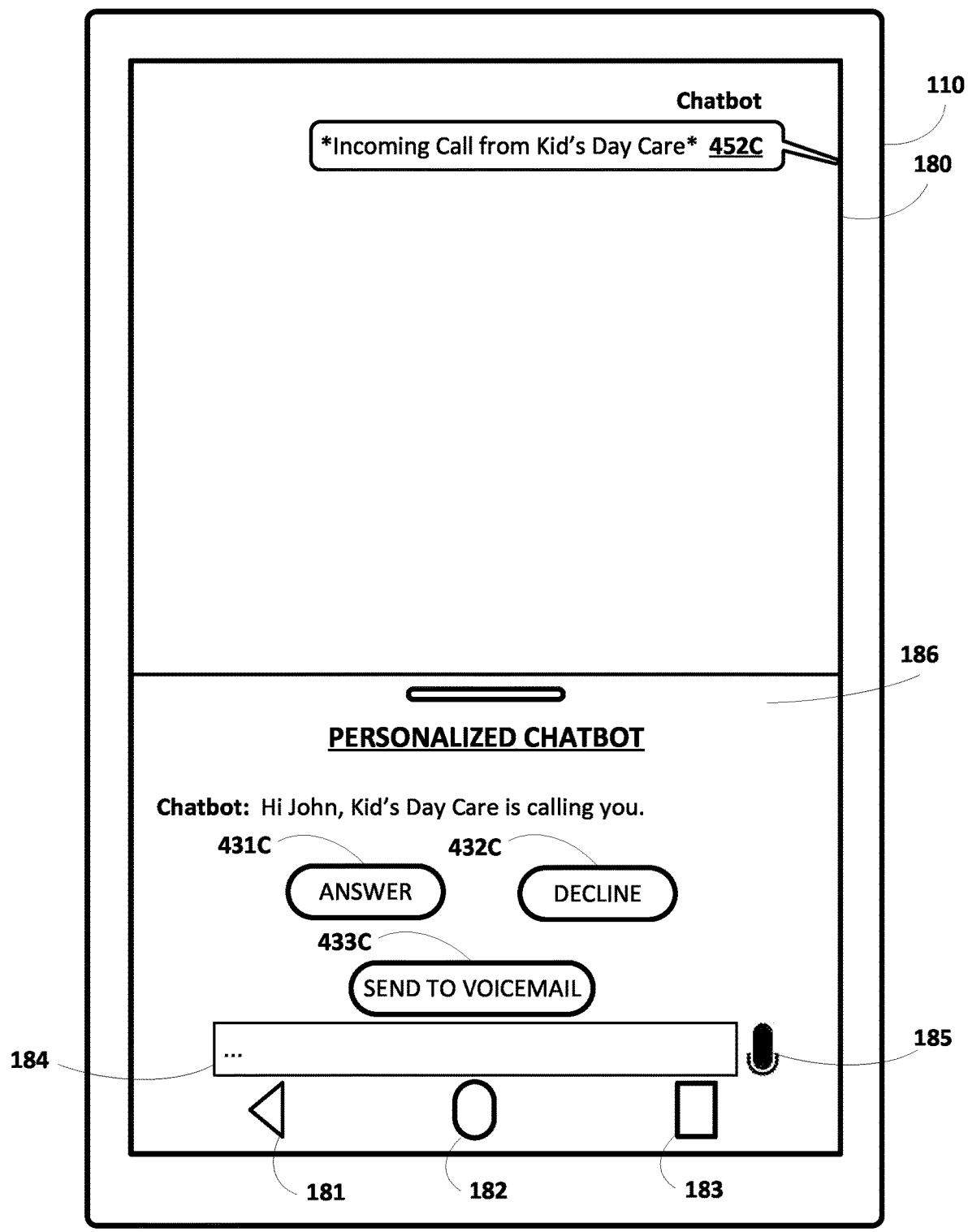

Turning now to FIGS. 4A, 4B, and 4C, non-limiting examples of determining whether to (1) fully automate a telephone call on behalf of a user, (2) partially automate the telephone call on behalf of the user, or (3) refrain from automating the telephone call on behalf of the user, and handling the telephone call based on the determination are depicted. FIGS. 4A, 4B, and 4C depict a client device 110 (e.g., the client device 110 from FIG. 1) having a display 180 that is touch sensitive to enable the user to provide touch inputs. One or more aspects of a chatbot (e.g., stored in the chatbot(s) database 150A from FIG. 1) may be implemented locally on the client device 110. For the sake of simplicity, operations of FIGS. 4A, 4B, and 4C are described herein as being performed by the chatbot. Although the client device 110 of FIGS. 4A, 4B, and 4C is depicted as a mobile phone, it should be understood that is not meant to be limiting. The client device 110 can be, for example, a stand-alone speaker, a speaker connected to a graphical user interface, a laptop, a desktop computer, and/or any other client device capable of making telephone calls and implementing an automated assistant.

The display 180 further includes a textual input interface element 184 that the user may select to provide typed input via a virtual keyboard, and a spoken input interface element 185 that the user may select to provide spoken input via microphone(s) of the client device 110. In some implementations, the user may provide spoken input via the microphone(s) without selection of the spoken input interface element 185. For example, active monitoring for spoken input via the microphone(s) may occur to obviate the need for the user to select the spoken input interface element 185. In some of those and/or in other implementations, the spoken input interface element 185 may be omitted. Moreover, in some implementations, the textual input interface element 184 may additionally and/or alternatively be omitted (e.g., the user may only provide spoken input). The display 180 also includes system interface elements 181, 182, 183 that may be interacted with by the user to cause the client device 110 to perform one or more actions.

Referring specifically to FIG. 4A, assume that a user of the client device 110 receives a telephone call from a human representative of Example Delivery Service—a fictitious parcel delivery service—as indicated at 452A and that the user is expecting a package to be delivered by Example Delivery Service. In this example, further assume that the chatbot determines that the telephone call should be fully automated based on the human representative being associated with Example Delivery Service. In this example, the chatbot can determine that the user is expecting the package to be delivered by Example Delivery Service based on, for example, email data that is accessible by the chatbot (e.g., via the user data database 110A) that includes a confirmation email with tracking information for the package. Further, the chatbot can determine to fully automate the telephone call based on Example Delivery Service being an entity with which the chatbot can handle tasks that are typically requested by human representatives associated with Example Delivery Service or other parcel delivery services (e.g., where the tasks can be stored in association with Example Delivery Service in the entities/tasks database 150B). Additionally, or alternatively, the chatbot can determine to fully automate the telephone call based on Example Delivery Service being an entity for which the user previously provided user input that indicates the user is expecting the telephone call from Example Delivery Service and that the chatbot should fully automate the telephone call and provide information to the human representative to leave the package at the door of the user's apartment. Accordingly, the chatbot can answer the telephone call on behalf of the user and attempt to fully automate the telephone call on behalf of the user.

For instance, in answering the telephone call on behalf of the user, the chatbot can cause synthesized speech 454A of "Hi, this is John's chatbot, how may I help you?" to be audibly rendered for presentation to the human representative of Example Delivery Service via speaker(s) of an additional client device of the human representative of Example Delivery Service. Further assume that responsive to receiving the synthesized speech 454A, the human representative of Example Delivery Service provides speech 456A of "This is Remy from Example Delivery Service, where should I leave John's package". Accordingly, the chatbot can respond with synthesized speech 458A of "Outside the door of apartment 6", and optionally provide a notification in a personalized chatbot interface 186 that indicates Example Delivery Service is leaving the package at the door of the user's apartment. Thus, the chatbot can fully automate the telephone call in the sense that the user is never an active participant in the telephone call and in the sense that the chatbot does not prompt the user to provide any inputs to enable the chatbot to conduct the conversation during the telephone call.

In generating the synthesized speech 454A in the example of FIG. 4A, the chatbot can utilize the peripheral behavior engine 156. For example, the chatbot can cause the peripheral behavior engine 156 to use a greetings behaviors that enable the chatbot to identify the user and/or to identify itself as a chatbot. The chatbot can cause the TTS engine 144 to process, using the TTS model(s) stored in the on-device ML model(s) database, textual data corresponding to the synthesized speech 454A to generate synthesized speech audio data that includes the synthesized speech 454A, and can transmit the synthesized speech audio data to the additional client device of the human representative of Example Delivery Service to cause the synthesized speech 454A to be audibly rendered for presentation to the human representative of Example Delivery Service via the speaker(s) of the additional client device.

Further, in generating the synthesized speech 458A in the example of FIG. 4A, the chatbot can process audio data that includes the speech 456A. For example, the chatbot can cause the ASR engine 141 to process, using the ASR model(s) stored in the on-device ML model(s) database 140A, the audio data to generate ASR output, cause the NLU engine 142 to process, using the NLU model(s) stored in the on-device ML model(s) database 140A, the ASR output to generate NLU output, and cause the fulfillment engine 143 to process, using the fulfillment model(s) and/or rule(s) stored in the on-device ML model(s) database 140A, the NLU output to generate fulfillment output. Based on the ASR output, the NLU output, and/or the fulfillment output, the chatbot can determine that the speech 456A includes a task provided by the human representative of Example Delivery Service in requesting a delivery address for the package. Moreover, the chatbot can access user profile data (e.g., stored in the user data database 110A) to determine a physical address of the user (e.g., "apartment 6"). Additionally, or alternatively, the chatbot can access prior conversations (e.g., stored in the voice activity database 150) where the user previously told other human representative of Example Delivery Service (or other human representatives of other parcel delivery services) where to leave a package. Accordingly, the chatbot can cause the TTS engine 144 to process, using the TTS model(s) stored in the on-device ML model(s) database, textual data corresponding to the synthesized speech 458A to generate synthesized speech audio data that includes the synthesized speech 458A, and can transmit the synthesized speech audio data to the additional client device of the human representative of Example Delivery Service to cause the synthesized speech 458A to be audibly rendered for presentation to the human representative of Example Delivery Service via the speaker(s) of the additional client device.

In contrast, and referring specifically to FIG. 4B, again assume that the user of the client device 110 receives a telephone call from a human representative of Example Delivery Service—the fictitious parcel delivery service—as indicated at 452B and that the user is expecting a package to be delivered by Example Delivery Service. In this example, further assume that the chatbot determines that the telephone call should be fully automated based on the human representative being associated with Example Delivery Service. In this example, the chatbot can determine that the user is expecting the package to be delivered by Example Delivery Service based on, for example, email data that is accessible by the chatbot (e.g., via the user data database 110A) that includes a confirmation email with tracking information for the package. Further, the chatbot can determine to fully automate the telephone call based on Example Delivery Service being an entity with which the chatbot can handle tasks that are typically requested by human representatives associated with Example Delivery Service or other parcel delivery services (e.g., where the tasks can be stored in association with Example Delivery Service in the entities/tasks database 150B). Additionally, or alternatively, the chatbot can determine to fully automate the telephone call based on Example Delivery Service being an entity for which the user previously provided user input that indicates the user is expecting the telephone call from Example Delivery Service and that the chatbot should fully automate the telephone call and provide information to the human representative to leave the package at the door of the user's apartment. Accordingly, the chatbot can answer the telephone call on behalf of the user and attempt to fully automate the telephone call on behalf of the user.

For instance, in answering the telephone call on behalf of the user, the chatbot can cause synthesized speech 454B of "Hi, this is John's chatbot, how may I help you?" to be audibly rendered for presentation to the human representative of Example Delivery Service via speaker(s) of an additional client device of the human representative of Example Delivery Service (e.g., as described above with respect to FIG. 4A). Further assume that responsive to receiving the synthesized speech 454B, the human representative of Example Delivery Service provides speech 456A of "This is Remy from Example Delivery Service, the package was damaged during transit, would you like to re-order the package or be refunded".

In this example, and based on processing audio data that includes the speech 456B, the chatbot can determine that the speech 456B includes a task provided by the human representative of Example Delivery Service in requesting information with respect to whether the user would like to re-order the damaged package or be refunded for the damaged package. Since there is no user data (e.g., stored in the user data database 110A) that indicates whether the user would like to re-order the damaged package or be refunded for the damaged package, the chatbot can determine to transition from fully automating the telephone call to partially automating the telephone call. Additionally, or alternatively, the user input provided by the user that indicated the chatbot should fully automate the telephone call based on Example Delivery Service may not contemplate the human representative requesting the user specify whether they would like to re-order the damaged package or be refunded for the damaged package. Accordingly, the chatbot can determine to transition from fully automating the telephone call to partially automating the telephone call.

In transitioning from fully automating the telephone call to partially automating the telephone call, the chatbot can cause the suggestion chip(s) engine 154 to determine one or more suggestion chips to be provided for presentation to the user of the client device 110. In this example, the one or more suggestion chip(s) can be determined based on content of the speech 456B, such as the options provided by the human representative of Example Delivery Service indicating whether the user would like to re-order the damaged package or be refunded for the damaged package. Accordingly, and as indicated by 458B, the chatbot can provide a first suggestion chip 431B associated with re-ordering the damaged package and a second suggestion chip 432B associated with being refunded for the damaged package via a personalized chatbot interface 186.

Notably, in the example of FIG. 4B, although the chatbot initially determined that the telephone call should be fully automated on behalf of the user, the chatbot is still capable of transitioning to partially automating the telephone call on behalf of the user based on determining that the chatbot is not capable of performing the task requested by the additional user. Additional detail with respect to partially automating telephone calls and the suggestion chip(s) are provided below (e.g., with respect to FIGS. 5A and 5B).

Referring specifically to FIG. 4C, assume that a user of the client device 110 receives a telephone call from a human representative of Kid's Day Care—a fictitious day care service—as indicated at 452C and that the user has one or more children enrolled at Kid's Day Care. In this example, and rather than fully automating or partially automating the telephone call, further assume that the chatbot determines to refrain from automating the telephone call on behalf of the user. In this example, the chatbot can determine to refrain from automating the telephone call based on the entity being Kid's Day Care and the user having one or more children enrolled at Kid's Day Care. Additionally, or alternatively, the chatbot can determine to refrain from automating the telephone call based on Kid's Day Care being an entity for which the user previously provided user input that indicates the chatbot should not automate the telephone call even if the user is busy with another task and other telephone calls should be automated (e.g., if the user is in a meeting). Accordingly, the chatbot can notify the user of the incoming call via a personalized chatbot interface 186 (and optionally provide selectable elements 431C, 352C, and 433C) and/or by other means.

Although FIGS. 4A, 4B, and 4C each depict transcriptions for the telephone calls, it should be understood that is for the sake of example and is not meant to be limiting. However, it should be understood that the chatbot can additionally, or alternatively, cause the transcriptions of the telephone calls to be visually rendered for presentation to the user. Further, it should be understood that the user can intervene and join the telephone calls at any point in the conversations. Moreover, although FIGS. 4A, 4B, and 4C are described with respect to the chatbot handling telephone calls, it should be understood that is not meant to be limiting. For instance, the chatbot can handle other voice-based and/or text-based conversations on behalf of the user in the same or similar manner described herein.

Figure 5A:
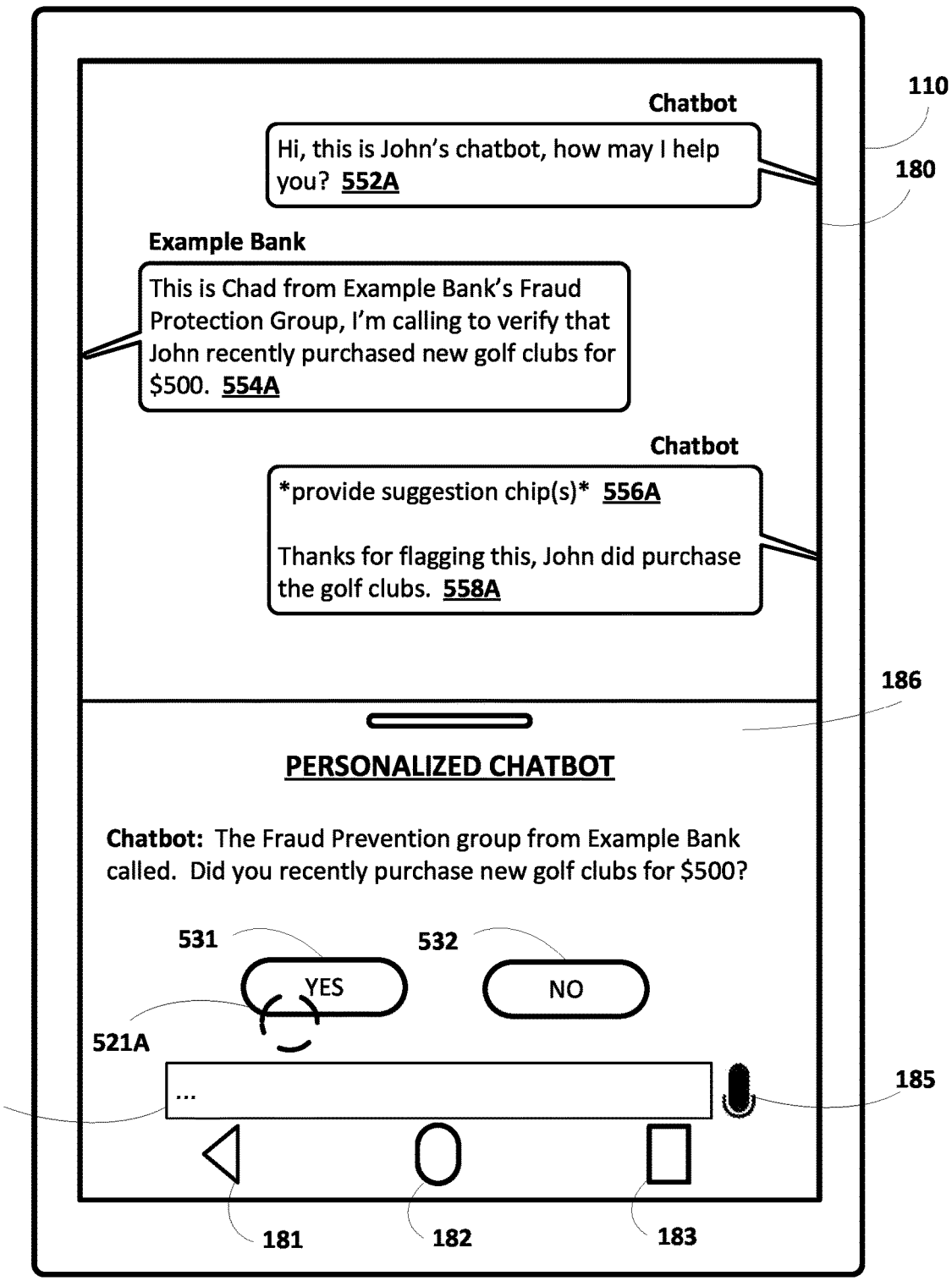
FIG. 5A and FIG. 5B depict non-limiting examples of dynamically adapting synthesized speech audio data to be provided for presentation to an additional user in response to receiving a user selection of a given suggestion chip and based on an entity that is associated with the additional user, in accordance with various implementations.
Figure 5B:
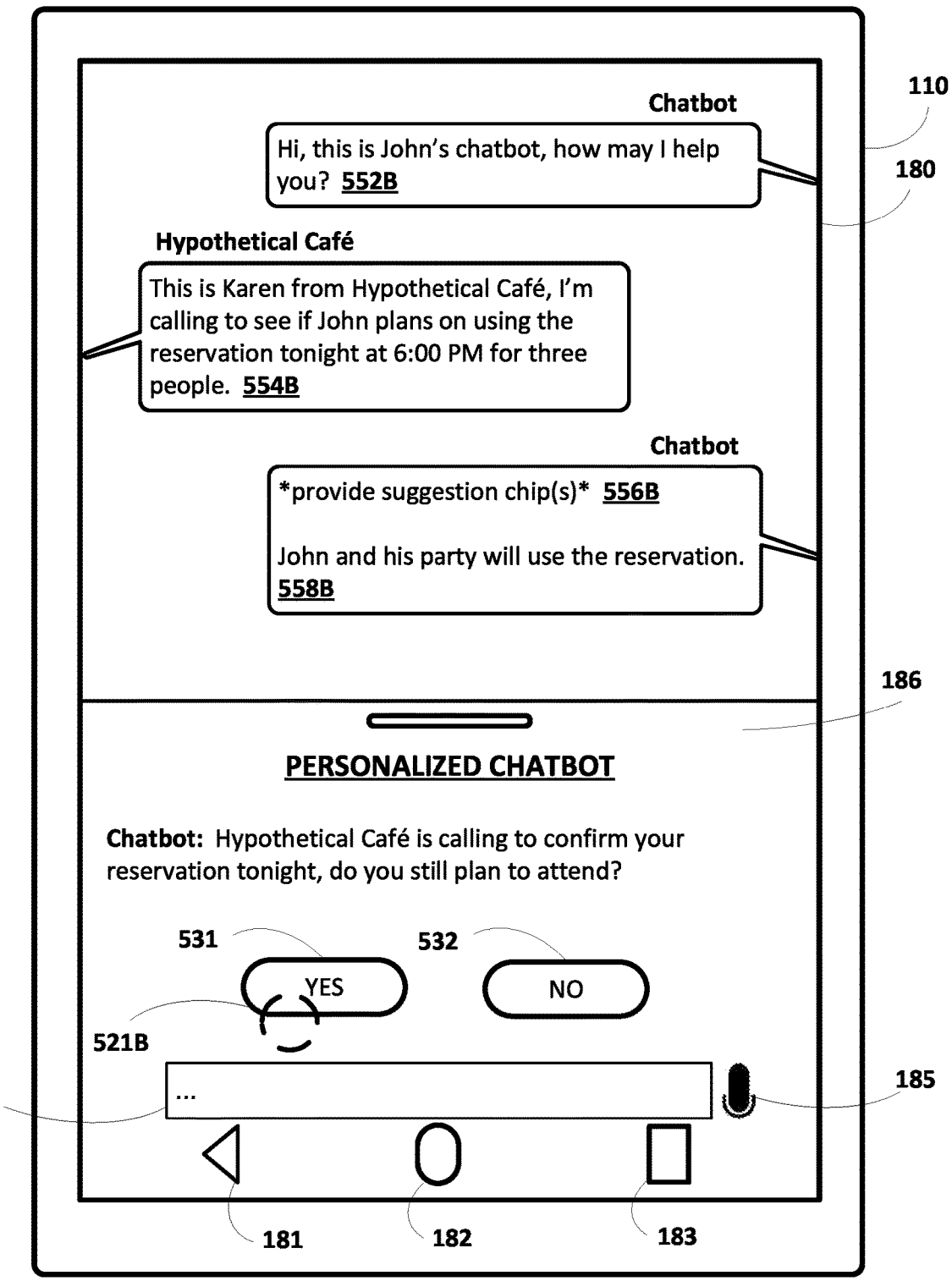

Turning now to FIGS. 5A and 5B, non-limiting examples of dynamically adapting synthesized speech audio data to be provided for presentation to an additional user in response to receiving a user selection of a given suggestion chip and based on an entity that is associated with the additional user are depicted. FIGS. 5A and 5B depict the same client device 110 described above with respect to FIGS. 4A, 4B, and 4C. Similar to FIGS. 4A, 4B, and 4C, and for the sake of simplicity, operations of FIGS. 5A and 5B are described herein as being performed by the chatbot.

Referring specifically to FIG. 5A, assume that a user of the client device 110 receives a telephone call from a human representative of Example Bank—a fictitious bank—and further assume that the chatbot is partially automating the telephone call with a human representation of the Example Bank and on behalf of the user of the client device 110. For instance, in answering the telephone call on behalf of the user, the chatbot can cause synthesized speech 552A of "Hi, this is John's chatbot, how may I help you?" to be audibly rendered for presentation to the human representative of Example Bank via speaker(s) of an additional client device of the human representative of Example Bank. Further assume that responsive to receiving the synthesized speech 552A, the human representative of Example Bank provides speech 554A of "This is Chad from Example Bank's Fraud Protection Group, I'm calling to verify that John recently purchased new golf clubs for $500".

In this example, and based on processing audio data that includes the speech 554A, the chatbot can determine that the speech 554A includes a task provided by the human representative of Example Bank in requesting information with respect to whether the user purchased the golf clubs. Accordingly, the chatbot can cause the suggestion chip(s) engine 154 to determine one or more suggestion chips to be provided for presentation to the user of the client device 110. In this example, the one or more suggestion chip(s) can be determined based on content of the speech 554A, such as options to confirm or deny whether the user of the client device 110 purchased the golf clubs. Accordingly, and as indicated by 556A, the chatbot can provide a first suggestion chip 531 associated with confirming the purchase of the golf clubs and a second suggestion chip 532 associated with denying the purchase of the golf clubs via a personalized chatbot interface 186.

Further assume that the user of the client device 110 provides a user selection 521A of the first suggestion chip 531 that is associated with confirming the purchase of the golf clubs. Accordingly, the chatbot can respond with synthesized speech 558A of "Thanks for flagging this, John did purchase the golf clubs". Notably, in generating the synthesized speech 558A in the example of FIG. 5A, the chatbot can convey a sentiment that is expressed by the first suggestion chip 531 (e.g., a confirmation sentiment conveyed by "John did purchase"), and contextualize the synthesized speech 558A with respect to the conversation (e.g., by thanking the human representative of Example Bank and calling back to the purpose of the telephone call (e.g., "golf clubs")).

Referring specifically to FIG. 5B, assume that the user of the client device 110 receives a telephone call from a human representative of Hypothetical Café—a fictitious restaurant—and further assume that the chatbot is partially automating the telephone call with a human representation of the Hypothetical Café and on behalf of the user of the client device 110. For instance, in answering the telephone call on behalf of the user, the chatbot can cause synthesized speech 552B of "Hi, this is John's chatbot, how may I help you?" to be audibly rendered for presentation to the human representative of Example Bank via speaker(s) of an additional client device of the human representative of Example Bank. Further assume that responsive to receiving the synthesized speech 552B, the human representative of Example Bank provides speech 554B of "This is Karen from Hypothetical Café, I'm calling to see if John plans on using the reservation tonight at 6:00 PM for three people".

In this example, and based on processing audio data that includes the speech 554B, the chatbot can determine that the speech 554B includes a task provided by the human representative of Hypothetical Café in requesting information with respect to whether the user intends to use a restaurant reservation. Accordingly, the chatbot can cause the suggestion chip(s) engine 154 to determine one or more suggestion chips to be provided for presentation to the user of the client device 110. In this example, the one or more suggestion chip(s) can be determined based on content of the speech 554B, such as options to confirm or deny whether the user of the client device 110 will use the restaurant reservation. Accordingly, and as indicated by 556B, the chatbot can provide the first suggestion chip 531 associated with confirming the use of the restaurant reservation and a second suggestion chip 532 associated with denying the use of the restaurant reservation via the personalized chatbot interface 186.

Further assume that the user of the client device 110 provides a user selection 521B of the first suggestion chip 531 that is associated with confirming the use of the restaurant reservation. Accordingly, the chatbot can respond with synthesized speech 558B of "John and his party will use the reservation". Notably, in generating the synthesized speech 558B in the example of FIG. 5B, the chatbot can convey a sentiment that is expressed by the first suggestion chip 531 (e.g., a confirmation sentiment conveyed by "John and his party will use"), and contextualize the synthesized speech 558B with respect to the conversation (e.g., by calling back to the purpose of the telephone call (e.g., "the reservation")).

Notably, in the examples of FIGS. 5A and 5B, the actual content of the first suggestion chip 531 is the same (e.g., textual data of "YES"). However, the synthesized speech 558A generated in response to the user selection 521A of the first suggestion chip 531 in the example of FIG. 5A differs from the synthesized speech 558B generated in response to the user selection 521B of the first suggestion chip 531 in the example of FIG. 5B. Put another way, the user selections of the same suggestion chip causes the same sentiment to be expressed in the different conversations, but the synthesized speech that conveys that sentiment differs and is more complex than the textual data that is included in the first suggestion chip. Accordingly, the chatbot can dynamically adapt the synthesized speech audio data for presentation to different entities in different scenarios even if the sentiment that is conveyed is the same.

Figure 6:
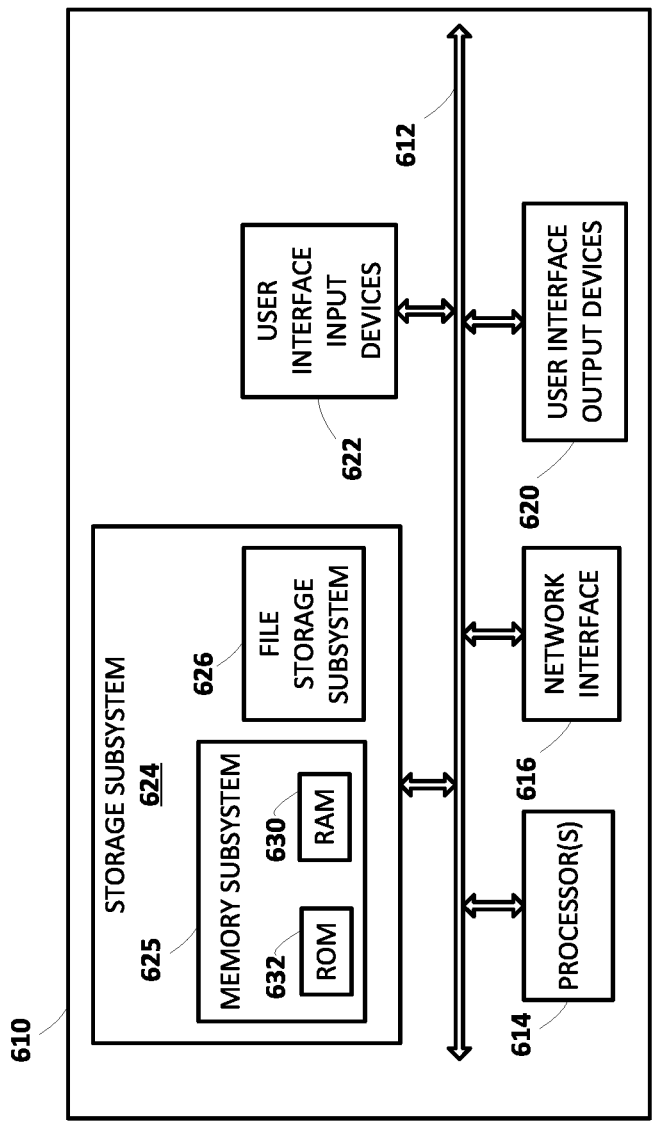
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving a telephone call, the telephone call being received via a client device of a user, and the telephone call being initiated by an additional user that is in addition to the user; in response to receiving the telephone call: identifying an entity that is associated with the additional user that initiated the telephone call; and determining, based on an entity that is associated with the additional user, whether to (1) fully automate the telephone call on behalf of the user, or (2) partially automate the telephone call on behalf of the user; in response to determining to (1) fully automate the telephone call on behalf of the user, causing the telephone call to be fully automated on behalf of the user; and in response to determining to (2) partially automate the telephone call on behalf of the user, causing the telephone call to be partially automated on behalf of the user.

These and other implementations of technology disclosed herein can optionally include one or more of the following features.

In some implementations, causing the telephone call to be fully automated on behalf of the user may include causing a chatbot, that is implemented locally at the client device of the user, to engage in a conversation with the additional user; and during the conversation with the additional user: causing the chatbot to perform a task, that is specified by the additional user, on behalf of the user and without prompting the user to provide any input.

In some versions of those implementations, causing the chatbot to engage in a conversation with the additional user may include: receiving corresponding instances of audio data from the additional user; generating, based on processing the corresponding instances of audio data from the additional user, corresponding instances of synthesized speech audio data that capture synthesized speech of the chatbot; and causing the corresponding instances of the synthesized speech audio data to be audibly rendered for presentation to the additional user via an additional client device of the additional user.

In some further versions of those implementations, processing a given instance of audio data, from among the corresponding instances of audio data received from the additional user, may include: processing, using an on-device automatic speech recognition (ASR) model that is stored locally at the client device, the given instance of audio data to generate given ASR output; processing, using an on-device natural language understanding (NLU) model that is stored locally at the client device, the given ASR output to generate given NLU output; and processing, using an on-device fulfillment model that is stored locally at the client device and/or on-device fulfillment rules that are stored locally at the client device, the given NLU to generate a given fulfillment output.

In some yet further versions of those implementations, generating a given corresponding instance of synthesized speech audio data, from among the corresponding instances of the synthesized speech audio data, and in response to receiving the given instance of audio data, may include: generating, based on the given fulfillment output, a given instance of textual data in furtherance of fulfilling the task;

and processing, using an on-device text-to-speech (TTS) model that is stored locally at the client device, the given instance of textual data to generate the given corresponding instance of synthesized speech audio data.

In additional or alternative versions of those implementations, the method may further include: subsequent to concluding the conversation with the additional user: generating a notification that identifies the entity and that includes a result of the task; and causing the notification to be provided for presentation to the user via the client device.

In some implementations, causing the telephone call to be partially automated on behalf of the user may include: causing a chatbot, that is implemented locally at the client device of the user, to engage in a conversation with the additional user; and during the conversation with the additional user: causing the chatbot to perform a task, that is specified by the additional user, on behalf of the user but prompting the user to provide one or more inputs.

In some versions of those implementations, causing the chatbot to engage in a conversation with the additional user may include: receiving corresponding instances of audio data from the additional user; generating, based on processing the corresponding instances of audio data from the additional user, corresponding instances of synthesized speech audio data that capture synthesized speech of the chatbot; and causing the corresponding instances of the synthesized speech audio data to be audibly rendered for presentation to the additional user via an additional client device of the additional user.

In some further versions of those implementations, processing a given instance of audio data, from among the corresponding instances of audio data received from the additional user, may include: processing, using an on-device automatic speech recognition (ASR) model that is stored locally at the client device, the given instance of audio data to generate given ASR output; processing, using an on-device natural language understanding (NLU) model that is stored locally at the client device, the given ASR output to generate given NLU output; and determining, based on the given ASR output and/or the given NLU output, one or more suggestions chips to be provided for presentation to the user.

In some yet further versions of those implementations, generating a given corresponding instance of synthesized speech audio data, from among the corresponding instances of the synthesized speech audio data, and in response to receiving the given instance of audio data, may include: generating, based on receiving a user selection of a given suggestion chip from among the one or more suggestion chips, a given instance of textual data in furtherance of fulfilling the task; and processing, using an on-device text-to-speech (TTS) model that is stored locally at the client device, the given instance of textual data to generate the given corresponding instance of synthesized speech audio data.

In some even yet further versions of those implementations, the given instance of textual data may express a sentiment of the given suggestion chip in a context of the conversation with the additional user.

In additional or alternative versions of those implementations, the method may further include: subsequent to concluding the conversation with the additional user: generating a notification that identifies the entity and that includes a result of the task; and causing the notification to be provided for presentation to the user via the client device.

In some implementations, determining whether to (1) fully automate the telephone call on behalf of the user, or (2) partially automate the telephone call on behalf of the user based on the entity that is associated with the additional user may include: determining a type of entity of the entity that is associated with the additional user; and determining whether a chatbot, that is implemented locally at the client device of the user, is capable of fully automating the telephone call on behalf of the user.

In some versions of those implementations, determining whether the automated assistant is capable of fully automating the telephone call on behalf of the user may be based on the user engaging in one or more previous conversations with the entity and/or an additional entity of the same type of entity as the entity.

In some further versions of those implementations, the chatbot may be previously trained based on the one or more previous conversations locally at the client device.

In additional or alternative further versions of those implementations, determining whether the automated assistant is capable of fully automating the telephone call on behalf of the user may be based on availability of user data, that is stored locally at the client device of the user, of the user of the client device.

In some implementations, determining whether to (1) fully automate the telephone call on behalf of the user, or (2) partially automate the telephone call on behalf of the user based on the entity that is associated with the additional user may include: determining, for the entity, whether the user previously provided user input that specifies: causing the telephone call to be fully automated on behalf of the user, or causing the telephone call to be partially automated on behalf of the user.

In some versions of those implementations, the method may further include determining whether the user input specifies temporal conditions associated with causing the telephone call to be fully automated on behalf of the user or causing the telephone call to be partially automated on behalf of the user. In these implementations, determining whether to (1) fully automate the telephone call on behalf of the user, or (2) partially automate the telephone call on behalf of the user, may be in response to determining that the temporal conditions are satisfied.

In some implementations, a method implemented by one or more processors is provided, and includes receiving a telephone call, the telephone call being received via a client device of a user, and the telephone call being initiated by an additional user that is in addition to the user; and in response to receiving the telephone call, causing the telephone call to be partially automated on behalf of the user. Causing the telephone call to be partially automated on behalf of the user includes causing a chatbot, that is implemented locally at the client device of the user, to engage in a conversation with the additional user; and during the conversation with the additional user: receiving a given instance of audio data that requests the chatbot to perform a task; determining, based on processing the given instance of audio data, a given suggestion chip that is associated with the task and that is to be provided for presentation to the user; causing the given suggestion chip to be provided for presentation to the user; in response to receiving a user selection, from the user, of the given suggestion chip and in response to determining that the additional user is associated with a first type of entity: generating, based on the user selection of the given suggestion and based on the additional user being associated with the first type of entity, a first instance of synthesized speech audio data that captures first synthesized speech of the chatbot; and causing the first instance of synthesized speech audio data to be audibly rendered for presentation to the additional user via an additional client device of the additional user; and in response to receiving the user selection, from the user, of the given suggestion chip and in response to determining that the additional user is associated with a second type of entity that differs from the first entity type: generating, based on the user selection of the given suggestion and based on the additional user being associated with the second type of entity, a second instance of synthesized speech audio data that captures second synthesized speech of the chatbot and that differs from the first synthesized speech of the chatbot; and causing the second instance of synthesized speech audio data to be audibly rendered for presentation to the additional user via the additional client device of the additional user.

These and other implementations of technology disclosed herein can optionally include one or more of the following features.

In some implementations, processing the given instance of audio data may include: processing, using an on-device automatic speech recognition (ASR) model that is stored locally at the client device, the given instance of audio data to generate given ASR output; processing, using an on-device natural language understanding (NLU) model that is stored locally at the client device, the given ASR output to generate given NLU output; and determining, based on the given ASR output and/or the given NLU output, the given suggestions chip that is associated with the task and that is to be provided for presentation to the user.

In some implementations, generating the first instance of synthesized speech audio data that captures the first synthesized speech of the chatbot may include: generating, based on receiving the user selection of the given suggestion chip, a first instance of textual data that is in furtherance of fulfilling the task and that is tailored to the first entity type; and processing, using an on-device text-to-speech (TTS) model that is stored locally at the client device, the first instance of textual data to generate the first instance of synthesized speech audio data.

In some versions of those implementations, the first instance of textual data may express a sentiment of the given suggestion chip in a first context of the conversation with the additional user, and the first context of the conversation with the additional user may be based on the additional user being associated with the first entity type and based on the given instance of audio data.

In some further versions of those implementations, generating the second instance of synthesized speech audio data that captures the second synthesized speech of the chatbot may include: generating, based on receiving the user selection of the given suggestion chip, a second instance of textual data that is in furtherance of fulfilling the task and that is tailored to the second entity type; and processing, using the on-device TTS model that is stored locally at the client device, the second instance of textual data to generate the second instance of synthesized speech audio data.

In some yet further versions of those implementations, the second instance of textual data may express a sentiment of the given suggestion chip in a second context of the conversation with the additional user, and the second context of the conversation with the additional user may be based on the additional user being associated with the second entity type and based on the given instance of audio data.

In some implementations, a method implemented by one or more processors is provided, and includes receiving a telephone call, the telephone call being received via a client device of a user, and the telephone call being initiated by an additional user that is in addition to the user; in response to receiving the telephone call: identifying an entity that is associated with the additional user that initiated the telephone call; and determining, based on the entity that is associated with the additional user, whether to (1) fully automate the telephone call on behalf of the user, (2) partially automate the telephone call on behalf of the user, or (3) refrain from automating the telephone call on behalf of the user; in response to determining to (1) fully automate the telephone call on behalf of the user, causing the telephone call to be fully automated on behalf of the user; in response to determining to (2) partially automate the telephone call on behalf of the user, causing the telephone call to be partially automated on behalf of the user; and in response to determining to (3) refrain from automating the telephone call on behalf of the user, causing the user to be notified of the telephone call via the client device or an additional client device.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
    receiving a telephone call, the telephone call being received via a client device of a user, and the telephone call being initiated by an additional user that is in addition to the user;
    in response to receiving the telephone call:
        identifying an entity that is associated with the additional user that initiated the telephone call; and
        determining, based on an entity that is associated with the additional user, whether to (1) fully automate the telephone call on behalf of the user, or (2) partially automate the telephone call on behalf of the user;
    in response to determining to (1) fully automate the telephone call on behalf of the user, causing the telephone call to be fully automated on behalf of the user; and
    in response to determining to (2) partially automate the telephone call on behalf of the user, causing the telephone call to be partially automated on behalf of the user.

2. The method of claim 1, wherein causing the telephone call to be fully automated on behalf of the user comprises:
    causing a chatbot, that is implemented locally at the client device of the user, to engage in a conversation with the additional user; and during the conversation with the additional user:
causing the chatbot to perform a task, that is specified by the additional user, on behalf of the user and without prompting the user to provide any input.

3. The method of claim 2, wherein causing the chatbot to engage in a conversation with the additional user comprises:
receiving corresponding instances of audio data from the additional user;
generating, based on processing the corresponding instances of audio data from the additional user, corresponding instances of synthesized speech audio data that capture synthesized speech of the chatbot; and
causing the corresponding instances of the synthesized speech audio data to be audibly rendered for presentation to the additional user via an additional client device of the additional user.

4. The method of claim 3, wherein processing a given instance of audio data, from among the corresponding instances of audio data received from the additional user, comprises:
processing, using an on-device automatic speech recognition (ASR) model that is stored locally at the client device, the given instance of audio data to generate given ASR output;
processing, using an on-device natural language understanding (NLU) model that is stored locally at the client device, the given ASR output to generate given NLU output; and
processing, using an on-device fulfillment model that is stored locally at the client device and/or on-device fulfillment rules that are stored locally at the client device, the given NLU to generate a given fulfillment output.

5. The method of claim 4, wherein generating a given corresponding instance of synthesized speech audio data, from among the corresponding instances of the synthesized speech audio data, and in response to receiving the given instance of audio data, comprises:
generating, based on the given fulfillment output, a given instance of textual data in furtherance of fulfilling the task; and
processing, using an on-device text-to-speech (TTS) model that is stored locally at the client device, the given instance of textual data to generate the given corresponding instance of synthesized speech audio data.

6. The method of claim 2, further comprising:
subsequent to concluding the conversation with the additional user:
generating a notification that identifies the entity and that includes a result of the task; and
causing the notification to be provided for presentation to the user via the client device.

7. The method of claim 1, wherein causing the telephone call to be partially automated on behalf of the user comprises:
causing a chatbot, that is implemented locally at the client device of the user, to engage in a conversation with the additional user; and
during the conversation with the additional user:
causing the chatbot to perform a task, that is specified by the additional user, on behalf of the user but prompting the user to provide one or more inputs.

8. The method of claim 7, wherein causing the chatbot to engage in a conversation with the additional user comprises:
receiving corresponding instances of audio data from the additional user;
generating, based on processing the corresponding instances of audio data from the additional user, corresponding instances of synthesized speech audio data that capture synthesized speech of the chatbot; and
causing the corresponding instances of the synthesized speech audio data to be audibly rendered for presentation to the additional user via an additional client device of the additional user.

9. The method of claim 8, wherein processing a given instance of audio data, from among the corresponding instances of audio data received from the additional user, comprises:
processing, using an on-device automatic speech recognition (ASR) model that is stored locally at the client device, the given instance of audio data to generate given ASR output;
processing, using an on-device natural language understanding (NLU) model that is stored locally at the client device, the given ASR output to generate given NLU output; and
determining, based on the given ASR output and/or the given NLU output, one or more suggestions chips to be provided for presentation to the user.

10. The method of claim 9, wherein generating a given corresponding instance of synthesized speech audio data, from among the corresponding instances of the synthesized speech audio data, and in response to receiving the given instance of audio data, comprises:
generating, based on receiving a user selection of a given suggestion chip from among the one or more suggestion chips, a given instance of textual data in furtherance of fulfilling the task; and
processing, using an on-device text-to-speech (TTS) model that is stored locally at the client device, the given instance of textual data to generate the given corresponding instance of synthesized speech audio data.

11. The method of claim 10, wherein the given instance of textual data expresses a sentiment of the given suggestion chip in a context of the conversation with the additional user.

12. The method of claim 7, further comprising:
subsequent to concluding the conversation with the additional user:
generating a notification that identifies the entity and that includes a result of the task; and
causing the notification to be provided for presentation to the user via the client device.

13. The method of claim 1, wherein determining whether to (1) fully automate the telephone call on behalf of the user, or (2) partially automate the telephone call on behalf of the user based on the entity that is associated with the additional user comprises:
determining a type of entity of the entity that is associated with the additional user; and
determining whether a chatbot, that is implemented locally at the client device of the user, is capable of fully automating the telephone call on behalf of the user.

14. The method of claim 13, wherein determining whether the automated assistant is capable of fully automating the telephone call on behalf of the user is based on the user engaging in one or more previous conversations with the entity and/or an additional entity of the same type of entity as the entity.

15. The method of claim 14, wherein the chatbot is previously trained based on the one or more previous conversations locally at the client device.

16. The method of claim 14, wherein determining whether the automated assistant is capable of fully automating the telephone call on behalf of the user is based on availability of user data, that is stored locally at the client device of the user, of the user of the client device.

17. The method of claim 1, wherein determining whether to (1) fully automate the telephone call on behalf of the user, or (2) partially automate the telephone call on behalf of the user based on the entity that is associated with the additional user comprises:
determining, for the entity, whether the user previously provided user input that specifies:
causing the telephone call to be fully automated on behalf of the user, or
causing the telephone call to be partially automated on behalf of the user.

18. The method of claim 17, further comprising:
determining whether the user input specifies temporal conditions associated with causing the telephone call to be fully automated on behalf of the user or causing the telephone call to be partially automated on behalf of the user, and
wherein determining whether to (1) fully automate the telephone call on behalf of the user, or (2) partially automate the telephone call on behalf of the user, is in response to determining that the temporal conditions are satisfied.

19. A method implemented by one or more processors, the method comprising:
receiving a telephone call, the telephone call being received via a client device of a user, and the telephone call being initiated by an additional user that is in addition to the user; and
in response to receiving the telephone call, causing the telephone call to be partially automated on behalf of the user, wherein causing the telephone call to be partially automated on behalf of the user comprises:
causing a chatbot, that is implemented locally at the client device of the user, to engage in a conversation with the additional user; and
during the conversation with the additional user:
receiving a given instance of audio data that requests the chatbot to perform a task;
determining, based on processing the given instance of audio data, a given suggestion chip that is associated with the task and that is to be provided for presentation to the user;
causing the given suggestion chip to be provided for presentation to the user;
in response to receiving a user selection, from the user, of the given suggestion chip and in response to determining that the additional user is associated with a first type of entity:
generating, based on the user selection of the given suggestion and based on the additional user being associated with the first type of entity, a first instance of synthesized speech audio data that captures first synthesized speech of the chatbot; and
causing the first instance of synthesized speech audio data to be audibly rendered for presentation to the additional user via an additional client device of the additional user; and
in response to receiving the user selection, from the user, of the given suggestion chip and in response to determining that the additional user is associated with a second type of entity that differs from the first entity type:
generating, based on the user selection of the given suggestion and based on the additional user being associated with the second type of entity, a second instance of synthesized speech audio data that captures second synthesized speech of the chatbot and that differs from the first synthesized speech of the chatbot; and
causing the second instance of synthesized speech audio data to be audibly rendered for presentation to the additional user via the additional client device of the additional user.

20. A method implemented by one or more processors, the method comprising:
receiving a telephone call, the telephone call being received via a client device of a user, and the telephone call being initiated by an additional user that is in addition to the user;
in response to receiving the telephone call:
identifying an entity that is associated with the additional user that initiated the telephone call; and
determining, based on the entity that is associated with the additional user, whether to (1) fully automate the telephone call on behalf of the user, (2) partially automate the telephone call on behalf of the user, or (3) refrain from automating the telephone call on behalf of the user;
in response to determining to (1) fully automate the telephone call on behalf of the user, causing the telephone call to be fully automated on behalf of the user;
in response to determining to (2) partially automate the telephone call on behalf of the user, causing the telephone call to be partially automated on behalf of the user; and
in response to determining to (3) refrain from automating the telephone call on behalf of the user, causing the user to be notified of the telephone call via the client device or an additional client device.

* * * * *